United States Patent [19]

Couture et al.

[11] Patent Number: 5,537,020
[45] Date of Patent: Jul. 16, 1996

[54] METHOD AND APPARATUS FOR STARTING UP A SYNCHRONOUS MACHINE

[75] Inventors: Pierre Couture, Boucherville; Bruno Francoeur; Ghislain Lambert, both of Beloeil, all of Canada

[73] Assignee: Hydro-Quebec, Montreal, Canada

[21] Appl. No.: 365,459

[22] Filed: Dec. 28, 1994

[51] Int. Cl.$^6$ ........................................ H02P 1/46
[52] U.S. Cl. ........................ 318/720; 318/722; 318/430; 318/254
[58] Field of Search ........................... 318/700, 720, 318/721, 722, 430, 431, 254, 138, 139

[56] References Cited

U.S. PATENT DOCUMENTS

| | | | |
|---|---|---|---|
| 4,368,411 | 1/1983 | Kidd | 318/254 |
| 4,409,530 | 10/1983 | Neeper et al. | 318/685 |
| 4,429,262 | 1/1984 | Utenick | 318/254 |
| 4,546,293 | 10/1985 | Peterson et al. | 318/254 |
| 4,629,961 | 12/1986 | Blaschke | 318/803 |
| 4,636,702 | 1/1987 | Hedges | 318/729 |
| 4,712,050 | 12/1987 | Nagasawa et al. | 318/254 |
| 4,748,387 | 5/1988 | Tanuma et al. | 318/254 |
| 4,814,677 | 3/1989 | Plunkett | 318/254 |
| 5,162,709 | 11/1992 | Ohi | 318/254 |
| 5,194,794 | 3/1993 | Shamoto | 318/603 |
| 5,204,604 | 4/1993 | Radun | 318/701 |
| 5,221,880 | 6/1993 | Bartholow et al. | 318/139 |
| 5,221,881 | 6/1993 | Cameron | 318/254 |
| 5,327,034 | 7/1994 | Couture et al. | 310/67 R |

*Primary Examiner*—Bentsu Ro
*Attorney, Agent, or Firm*—Foley & Lardner

[57] ABSTRACT

The method and the apparatus are for starting up a synchronous machine having a rotor and a stator provided with a winding. The rotor has an initial position with respect to the stator. The method comprises the steps of (a) initializing a starting phase of a first vectorial sum of successive vectorial sums of currents to be applied to the winding; (b) applying successive vectorial sums of currents to the winding; (c) detecting, for each of the vectorial sums of currents applied in step (b), a movement of the rotor and a direction thereof; (d) compensating, for each of the movement and direction detected in step (c), the phase of a subsequent vectorial sum of currents applied to the winding to bring back the rotor towards its initial position; (e) detecting whether the rotor has moved with respect to the stator after applying of the successive vectorial sums of currents and either increasing the starting phase by a value different from a multiple of 180 electrical degrees if the rotor has not moved and returning to step (b), or going to a step (f); and (f) after step (e), storing the phase value of the last of the successive vectorial sums applied to the winding, whereby said machine is now ready to operate from the phase value stored in step (f).

24 Claims, 12 Drawing Sheets

METHOD AND APPARATUS FOR STARTING UP A SYNCHRONOUS MACHINE

FIELD OF THE INVENTION

The present invention relates to a method and an apparatus for starting up an AC machine having a rotor and a stator provided with a winding.

PRIOR ART

Known in the art, there is the U.S. Pat. No. 5,221,881 by Scott W. CAMERON in which there is described a circuit for operating a polyphase DC motor. On lines 52 to 60 of the first column, it is mentioned that the most widely used way, for example, was to start the motor in a known position, then develop information related to the instantaneous or current position of the motor. One source of such instantaneous position information was developed as a part of the commutation process, and involved identifying the floating coil, and monitoring its back emf, that is, the emf induced into the coil as it moves through the magnetic field provided by the stator. One problem with the method for starting up the motor is that the rotor has to start on a known position and, to know the position of the rotor, it has to move substantially with respect to the stator so that the emf can be monitored. More specifically, this is a problem in a case where the motor is connected to a heavy load and it is not possible to allow random movement of the rotor during the starting up.

Also known in the art, there is the U.S. Pat. No. 4,814,677 by Allan B. PLUNKETT in which there is described a field orientation control of a permanent magnet motor. On lines 22 to 28 of column 7, it is mentioned that the magnitude of current $I_a$ is sufficient to cause the rotor to move into its preferred alignment with the applied stator field. After the $I_a$ current is applied for sufficient time to permit rotor alignment, inverter 37 is energized to command current to ramp up in the β axis which generates a rotating MMF excitation wave in the airgap, producing torque and initiating rotor rotation. Again, the drawback with this operation is that when the rotor is connected to a heavy load, sometimes it is not possible to allow substantial random movement of the rotor during starting up of the motor.

Also, in the U.S. Pat. No. 4,748,387 by Jiro TANUMA et al., there is described a DC brushless motor driving method and apparatus for accurately controlling starting position of the rotor. At lines 4 to 15 of the third column, it is mentioned that " . . . comprises the steps of, at a start-up of the motor, switching the current applied to the armature coils to excite them in several different phases to thereby locate the rotor at a starting angular position, in the event when the rotor is located at the starting angular position, cancelling load acting on the rotor, at least before the last phase is excited, and subsequently controlling rotation drive by counting output pulses of the speed sensing means to sense an angular position of the rotor. The rotation direction of the rotor is controlled on the basis of output pulses of the sensing means and on a resulting count of those output pulses.". Again, the drawback with the method for starting up the motor is that the load acting on the rotor has to be cancelled during the starting up operation, this method does not allow to start up the motor when the load is connected to the motor.

Also known in the art, are the following patents:
U.S. Pat. No. 4,368,411, KIDD
U.S. Pat. No. 4,409,530, NEEPER et al.
U.S. Pat. No. 4,429,262, UTENICK
U.S. Pat. No. 4,546,293, PETERSON et al.
U.S. Pat. No. 4,712,050, NAGASAWA et al.
U.S. Pat. No. 5,162,709, OHI
U.S. Pat. No. 5,194,794, SHAMOTO
U.S. Pat. No. 5,204,604, RADUN
U.S. Pat. No. 5,221,880, BARTHOLOW et al.

None of those patents can provide a method for starting up a motor in a case where the motor is connected to a heavy load and no substantial random movement of the rotor is allowed.

An object of the present invention is to provide a method and an apparatus for starting up an AC machine having a rotor and a stator provided with a winding even in the case where the motor is connected to a heavy load.

SUMMARY OF THE INVENTION

According to the present invention, there is provided a method for starting up a synchronous machine having a rotor and a stator provided with a winding, said rotor having an initial position with respect to said stator, said method comprising the steps of:

(a) initializing a starting phase of a first vectorial sum of successive vectorial sums of currents to be applied to said winding;

(b) applying successive vectorial sums of currents to said winding, each of said successive vectorial sums having a phase;

(c) detecting, for each of said vectorial sums of currents applied in said step (b), a movement of said rotor and a direction thereof with respect to said stator;

(d) compensating, for each of said movement and direction detected in said step (c), the phase of a subsequent vectorial sum of said successive vectorial sums of currents applied to said winding to bring back said rotor towards said initial position;

(e) detecting whether said rotor has moved with respect to said stator after applying of said successive vectorial sums of currents and either increasing said starting phase by a value different from a multiple of 180 electrical degrees if said rotor has not moved with respect to said stator and returning to said step (b), or going to a step (f); and (f) after said step (e), storing the phase value of the last of said successive vectorial sums applied to said winding, whereby said machine is now ready to operate from said phase value stored in said step (f).

Also, according to the present invention, there is also provided an apparatus for starting up a synchronous machine having a rotor and a stator provided with a winding, said rotor having an initial position with respect to said stator, said apparatus comprising:

means for initializing a starting phase of a first vectorial sum of successive vectorial sums of currents to be applied to said winding;

means for applying successive vectorial sums of currents to said winding, each of said successive vectorial sums having a phase;

means for detecting, for each of said applied vectorial sums of currents, a movement of said rotor and a direction thereof with respect to said stator;

means for compensating, for each of said movement and direction thereof which have been detected, the phase of a subsequent vectorial sum of said successive vectorial sums of currents applied to said winding to bring back said rotor towards said initial position;

means for increasing said starting phase by a value different from a multiple of 180 electrical degrees if said rotor, after applying of said successive vectorial sums of currents, has not moved with respect to said stator; and means for storing the phase value of the last of said successive vectorial sums applied to said rotor, whereby said machine is ready to operate from said phase value stored in said means for storing.

The objects, advantages and other features of the present invention will become more apparent upon reading of the following non-restrictive description of preferred embodiments thereof, given with reference to the accompanying drawings.

DETAILED DESCRIPTION OF THE DRAWINGS

Figure 1:
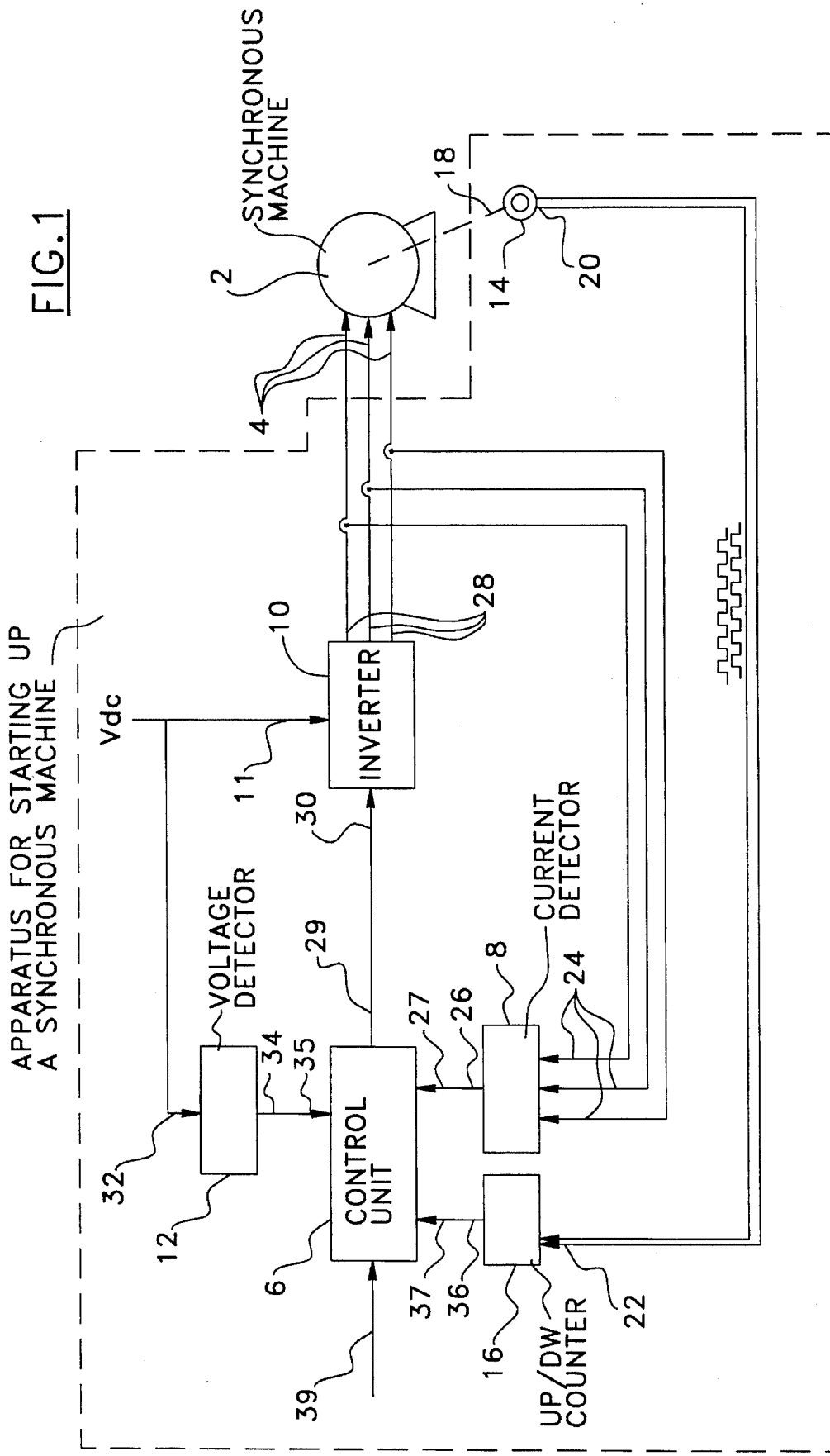
FIG. 1 is a block diagram showing an apparatus for starting up a synchronous machine in accordance with the present invention.
Figure 7:
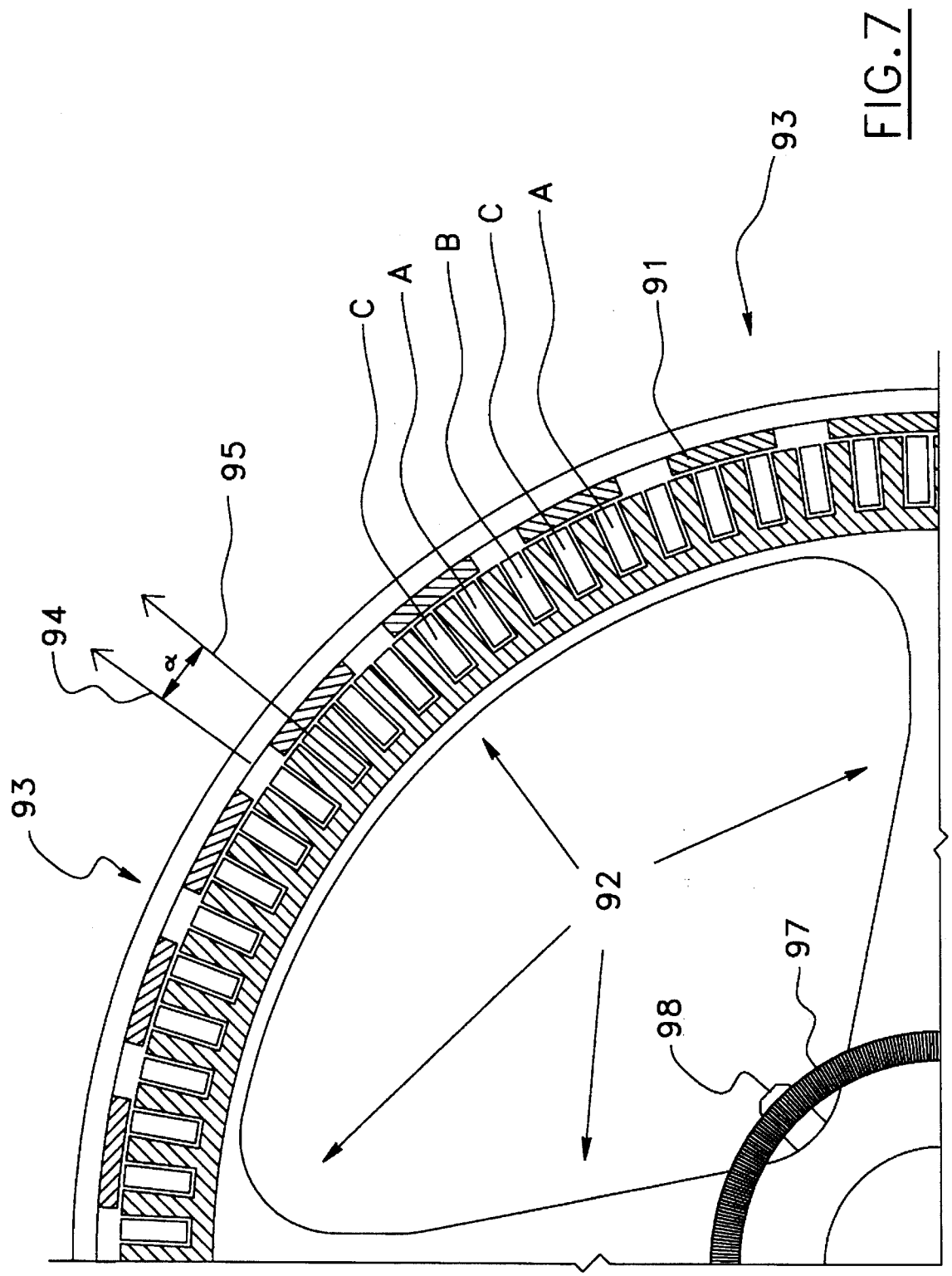
FIG. 7 is a partial cross section view of a synchronous machine.
Figure 4B:
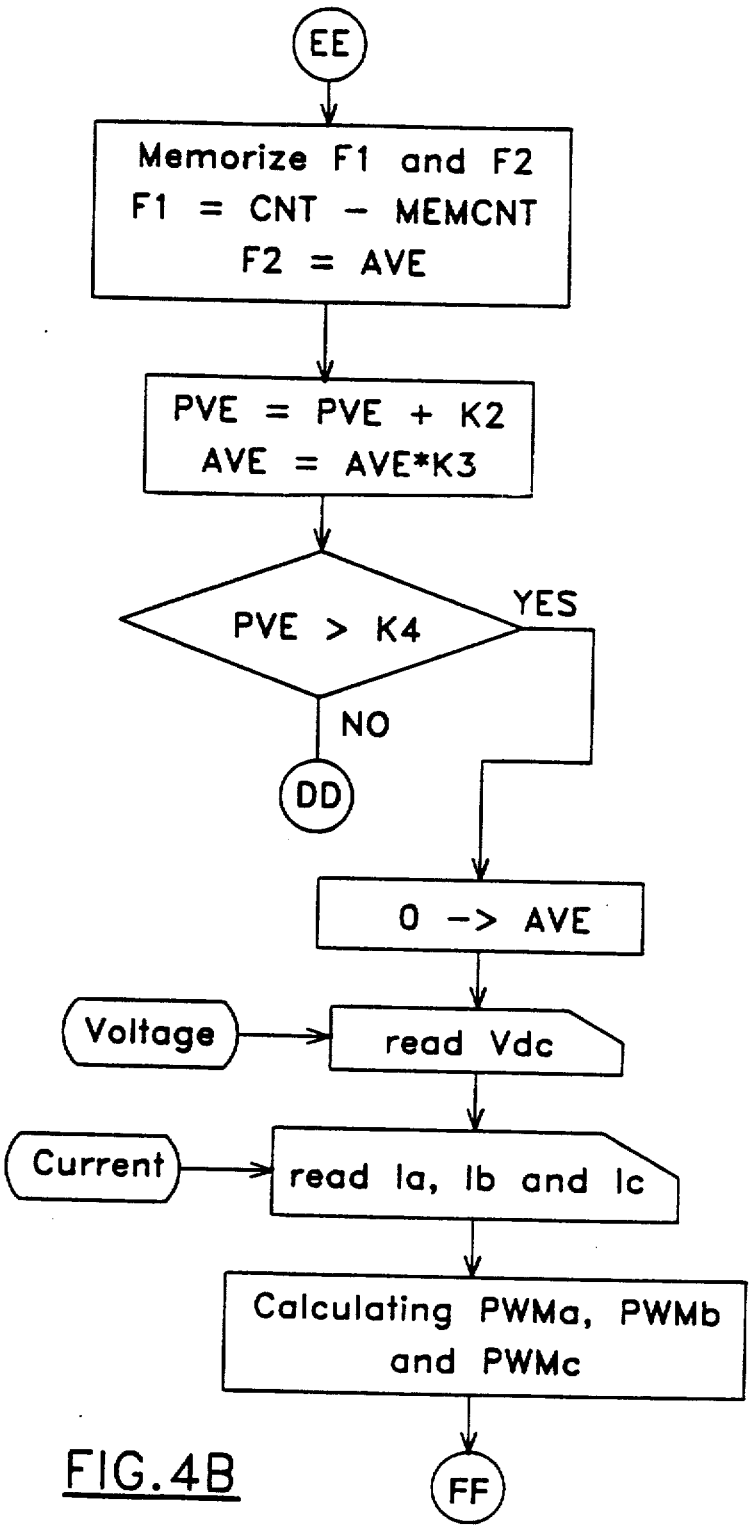
Figure 4C:
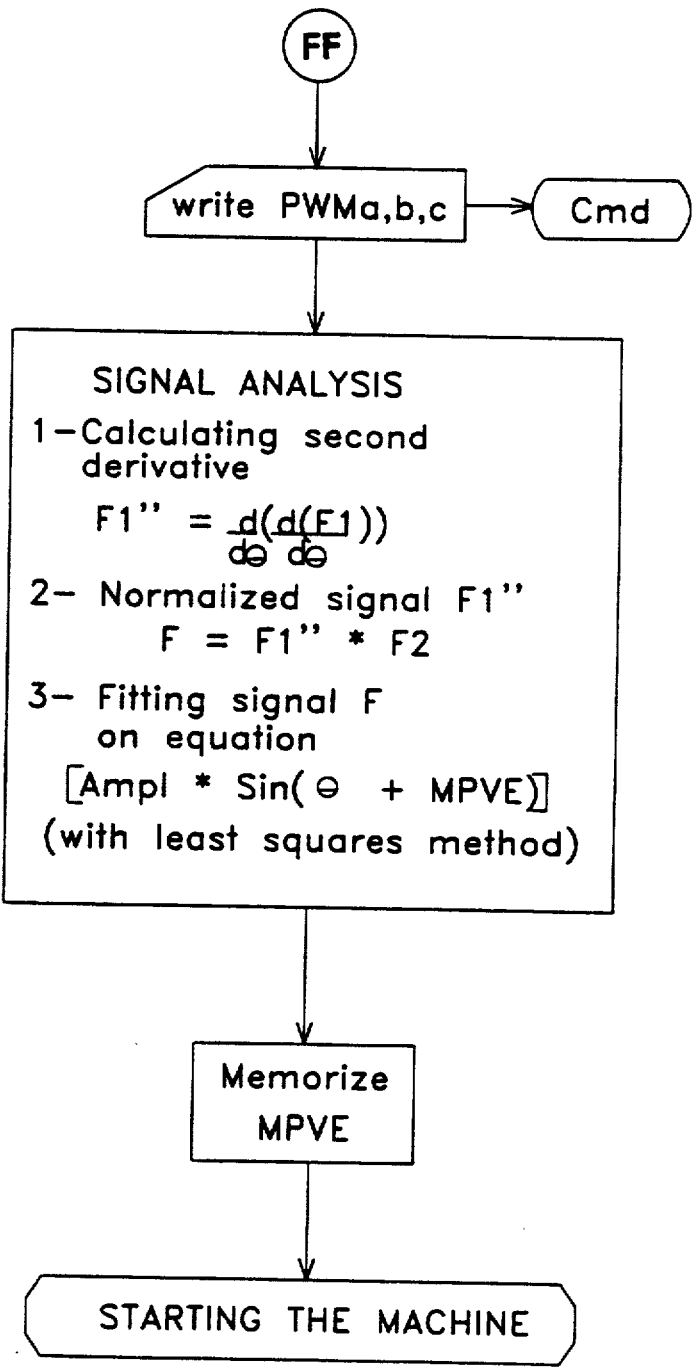

Referring now to FIG. 1, there is shown an apparatus for starting up a synchronous machine (2) having a rotor (not shown) and a stator (not shown) provided with a winding (not shown). The rotor and the stator provided with a winding are shown in FIG. 7. Such synchronous machine with a rotor and a stator provided with a winding is well known in the art. The rotor has an unknown initial position with respect to the stator.

For example, the synchronous machine is a motor wheel of an electric vehicle, as the one showed in U.S. Pat. No. 5,327,034. As it can be easily understood, no substantial random movement of the vehicle can be allowed during the starting up for security reasons.

The apparatus comprises means for initializing (6) a staring phase of a first vectorial sum of successive vectorial sums of currents to be applied to the winding of the stator by means of supply lines (4); and means for applying (6, 8, 10 and 12) successive vectorial sums of currents to the winding. Each of the successive vectorial sums has a given phase.

The apparatus also comprises means for detecting (14 and 16), for each of the applied vectorial sums of currents, a movement of the rotor of the machine (2) and a direction thereof with respect to the stator; means for compensating (6), for each of the movement and direction thereof which have been detected, the phase of a subsequent vectorial sum of the successive vectorial sums of currents applied to the winding of the machine (2) to bring back the rotor towards its initial position; and means for increasing (6) the starting phase by a value different from a multiple of 180 electrical degrees if the rotor of the machine (2), after applying of the successive vectorial sums of currents, has not moved with respect to the stator.

The apparatus also comprises means for storing (6) the phase value of the last of the successive vectorial sums applied to the rotor of the machine (2), whereby the machine (2) is ready to operate from the phase value stored in the means for storing (4).

The means for detecting (14 and 16) the movement of the rotor of the machine (2) and the direction thereof with respect to the stator comprise an up/down counter (16) and an incremental encoder (14) having an input (18) connected to the rotor of the machine (2), and an output (20) connected to an input (22) of the up/down counter (16) which has an output (36) connected to an input (17) of the control unit (6).

Preferably, in a case where the machine is a motor wheel of a vehicle and no substantial random movement of the vehicle is allowed, the resolution of the incremental encoder (14) has to be appropriate in that it should be sufficiently high so that, a very small movement of the rotor can be detected and compensated even if the motor wheel is immobilized by a brake means.

The means for initializing, the means for increasing the means for storing and the means for compensating are all parts of a control unit (6) which is provided with an input (39) for receiving a command. The control unit (6) is a digital signal processing TM320C30 provided with an operating software.

The means for applying (6, 8, 10 and 12) comprise a control unit (6) provided with an operating software; a current detector (8) having inputs (24) for detecting the currents applied to the winding of the machine (2) and a digital output (26) connected to an input (27) of the control unit (6); an inverter (10) having outputs (28) for applying the successive vectorial sums of currents to the winding of the machine (2) by means of supply lines (4), an input (11) for power supply voltage, and an input (30) for receiving commanding signals from an output (29) of the control unit (6); and a voltage detector (12) having an input (32) for detecting a power supply voltage Vdc applied to the inverter (10) and a digital output (34) connected to an input (35) of the control unit (6).

Figure 3A:
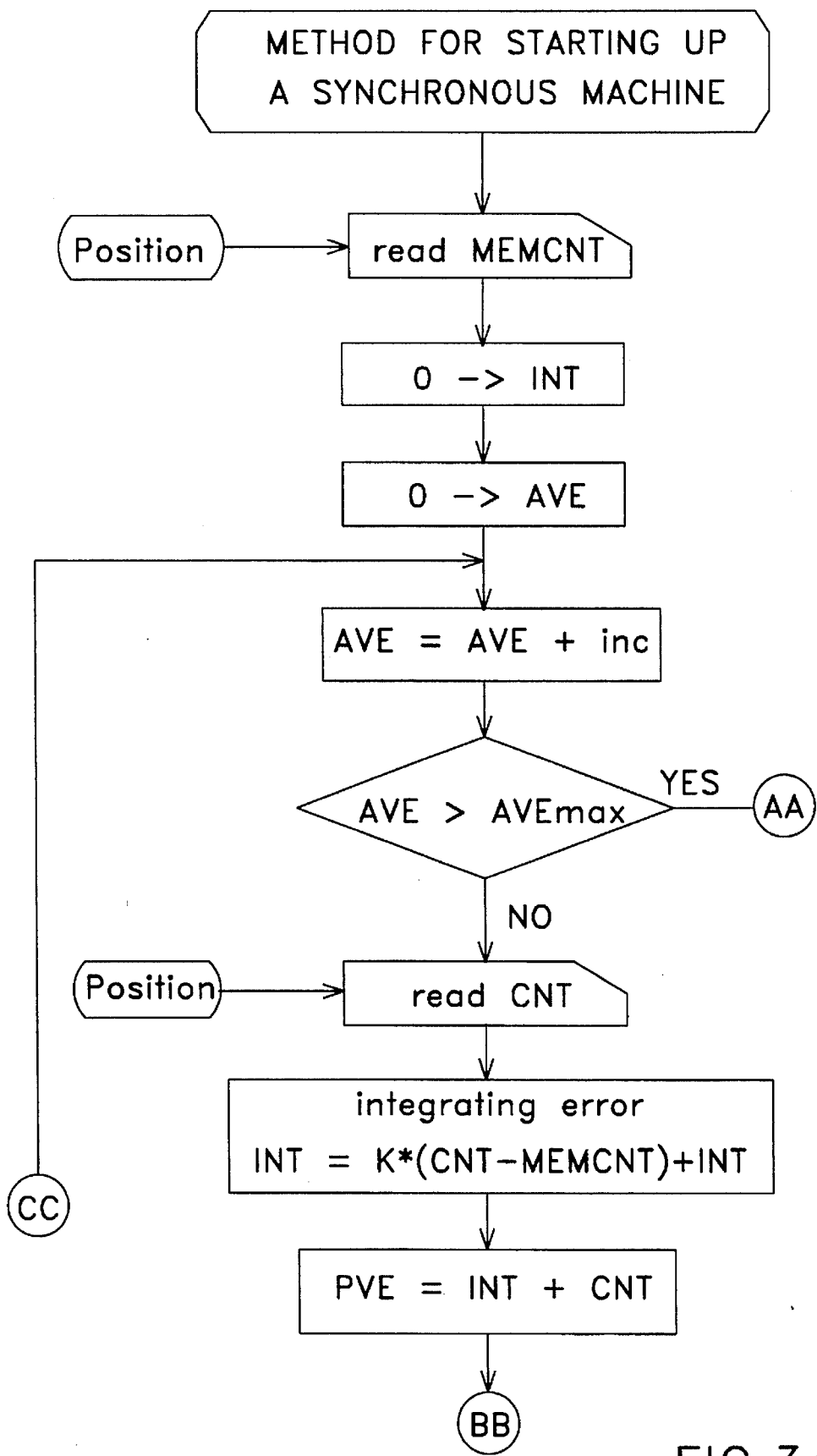
FIGS. 3A–3B are an algorithm chart showing a method for starting up a synchronous machine in accordance with the present invention.
Figure 3B:
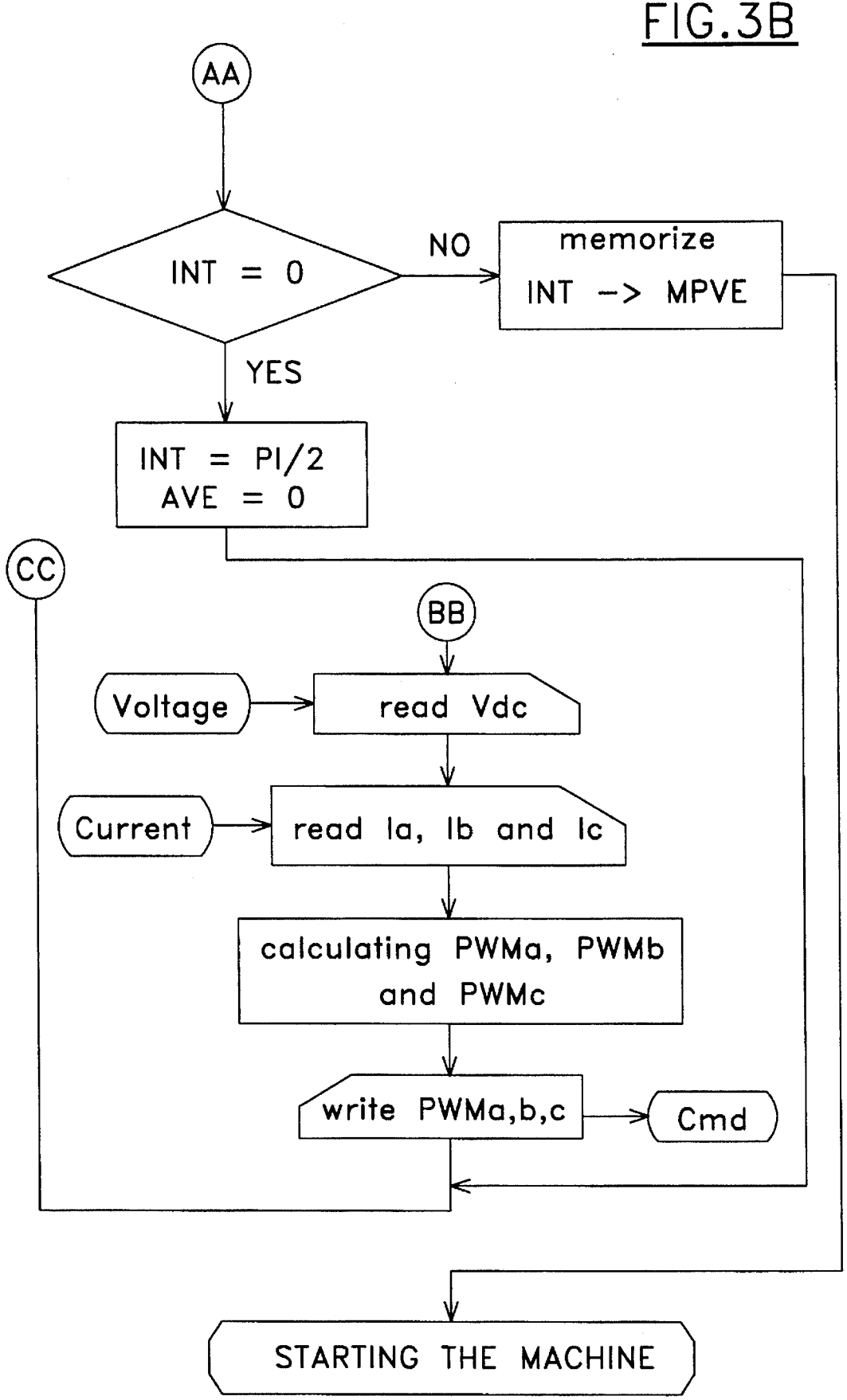

Referring now to FIGS. 3A–3B there is shown a method for starting up the synchronous machine (2) having a rotor and a stator provided with a winding. The method can be performed by the apparatus described above. The rotor has an initial position with respect to the stator.

The method comprises a first step of (a) initializing a starting phase of a first vectorial sum of successive vectorial sums of currents to be applied to the winding of the machine (2).

Preferably, step (a) comprises the steps of (i) determining an arbitrary position of the rotor and storing it in variable MEMCNT; (ii) storing a zero value in variable INT which represents the integrated error of the phase; (iii) storing a zero value in variable AVE which represents an amplitude; (iv) increasing variable AVE by value inc having for example the value of 0.02; (v) verifying whether variable AVE is higher than constant AVEmax having a value of 200 for example, which is not the case in the initializing step; (vi) detecting again the position of the rotor and storing it in variable CNT which, at this point, has the same value as variable MEMCNT because the rotor has not moved; (vii) calculating an integrating error by means of the following equation INT=K*(CNT-MEMCNT)+INT where K is a constant and has for example the value of −0.02, the value of INT remaining the same because, at this point, CNT is equal to MEMCNT; (viii) storing the sum of CNT and INT into a variable PVE, which represent a phase of the first vectorial sum of successive vectorial sums of current, (ix) detecting the voltage supplied to the inverter and storing it in variable Vdc; (x) detecting the three currents applied to the machine (2) and storing them in variables Ia, Ib and Ic which, at this point in the initializing step, have zero values; and (xi) calculating values of PWMa, PWMb and PWMc from the values of PVE, AVE, Vdc, Ia, Ib and Ic. The starting phase of the first vectorial sum of successive vectorial sums of current is now initialized.

The method also comprises a next step of (b) applying successive vectorial sums of currents to the winding, each of the successive vectorial sums having a phase.

Preferably, this step (b) comprises steps of (xii) producing a command signal Cmd for the inverter, identified by number (10) in FIG. 1, resulting from values PWMa, PWMb and PWMc, going to step (iv), and repeating steps (iv) to (xii) until the condition of step (v) is satisfied.

More precisely, the step (b) comprises the steps of (iv) determining, for each of the successive vectorial sums of currents applied to the winding, an increased amplitude value of a subsequent vectorial sum of the successive vectorial sums of currents to be applied to the winding; and (v) determining whether the increased amplitude value of the subsequent vectorial sum has reached a predetermined amplitude value, and either terminating the applying of successive sums of currents of step (b) and going to step (e) if the increased amplitude value of the subsequent vectorial sum has reached the predetermined amplitude value, or continuing the applying of successive vectorial sums of the step (b).

Preferably, in step (b), each of the successive vectorial sums of currents is applied to the winding by means of pulse-width modulated signals.

The method also comprises the step of (c) detecting, for each of the vectorial sums of currents applied in step (b), a movement of the rotor of the machine (2) and a direction thereof with respect to the stator. Preferably this step is performed by the above steps (vi), (vii) and (viii).

The method also comprises the steps of (d) compensating, for each of the movement and direction detected in step (d), the phase of a subsequent vectorial sum of the successive vectorial sums of currents applied to the winding to bring back the rotor towards its initial position. Preferably, this step is performed in the above step (xi) where the values of PWMa, PWMb and PWMc are calculated in such a manner that they take into account the last calculated integrated error INT by which said compensating is done.

Preferably, in step (d), the phase of a subsequent vectorial sum of the successive vectorial sums of currents applied to the winding is compensated by means of the following equations PVE=INT+CNT, INT=K*MOV+INT1, where PVE is the phase of a subsequent vectorial sum of the successive vectorial sums of currents, INT1 is the integrated error of the last calculated integrated error, INT is the integrated error, MOV equals (CNT-MEMCNT) which represents the movement and the direction thereof detected in step (c) with respect to the initial position, CNT is a value representative of the position of the rotor and K is a predetermined constant.

The method also comprises the step of (e) detecting whether the rotor has moved with respect to the stator after applying of the successive vectorial sums of currents and either increasing the starting phase by a value different from a multiple of 180 electrical degrees which is preferably 90 electrical degrees if the rotor has not moved with respect to the stator and returning to step (b), or going to a step (f).

Preferably, this step (e) is performed after that the condition of step (v) has been considered positive, and comprises the step of (xiii) verifying whether INT is equal to zero which means that the rotor has not moved and, if the condition is positive, the additional steps of (xiv) storing a 90 degrees value in the variable INT, (xv) storing a zero value in the variable AVE and going back to step (iv).

The method also comprises the step of (f) storing, after that the condition of step (e) has been considered negative, the integrated error value INT of the last of the successive vectorial sums applied to the winding in a variable MPVE, whereby the machine (2) is now ready to operate from the integrated error value stored in step (f). Preferably, this step (f) comprises the step of (xvi) storing the value of the variable INT into a variable MPVE which is said phase error value from which the machine is now ready to operate.

The apparatus shown in FIG. 1, can also be used to embody a second different apparatus for starting up a synchronous machine having a rotor (not shown) and a stator (not shown) provided with a winding (not shown). This second apparatus is different from the apparatus described above in that the operating software of the control unit is different.

This second apparatus comprises means for applying (6, 8, 10 and 12) a predetermined sequence of vectorial sums of currents to the winding of the machine (2), the sequence of vectorial sums having predetermined variable phases; means for detecting and storing (6, 14 and 16), for each of the applied vectorial sums of currents, a movement of the rotor of the machine (2) and a direction thereof with respect to the stator; means for establishing (6) a function F1 with respect to phase, based on the movements and directions thereof; means for establishing (6) a function F2 with respect to phase, based on amplitudes of the sequence of vectorial sums; and means for mathematically fitting (6) an equation resulting from the functions F1 and F2 with a predetermined equation to obtain a phase difference, whereby the machine (2) is ready to operate from the phase difference.

Preferably, the means for detecting and storing the movement of the rotor of the machine (2) and the direction thereof with respect to the stator comprise a control unit (6) provided with an operating software, an up/down counter (16) having an output (36) connected to an input (37) of the control unit (6), and an incremental encoder (14) having an input (18) connected to the rotor of the machine (2), and an output (20) connected to an input (22) of the up/down counter (16). Preferably, the means for establishing the function F1, the means for establishing the function F2 and the means for mathematically fitting the equation resulting from the functions F1 and F2 are all parts of the control unit (6) which is provided with an adequate operating software.

Preferably, the means for applying comprise the control unit (6) provided with an appropriate operating software; a current detector (8) having inputs (24) for detecting the currents applied to the winding of the machine (2) by means of supply lines (4), and a digital output (26) connected to an input (27) of the control unit (6); an inverter (10) having outputs (28) for applying the successive vectorial sums of currents to the winding, and an input (11) for power supply voltage, and an input (30) for receiving commanding signals from an output (29) of the control unit (6); and a voltage detector (12) having an input (32) for detecting a power supply voltage Vdc applied to the inverter (10), and a digital output (34) connected to an input (35) of the control unit (6).

Figure 4A:
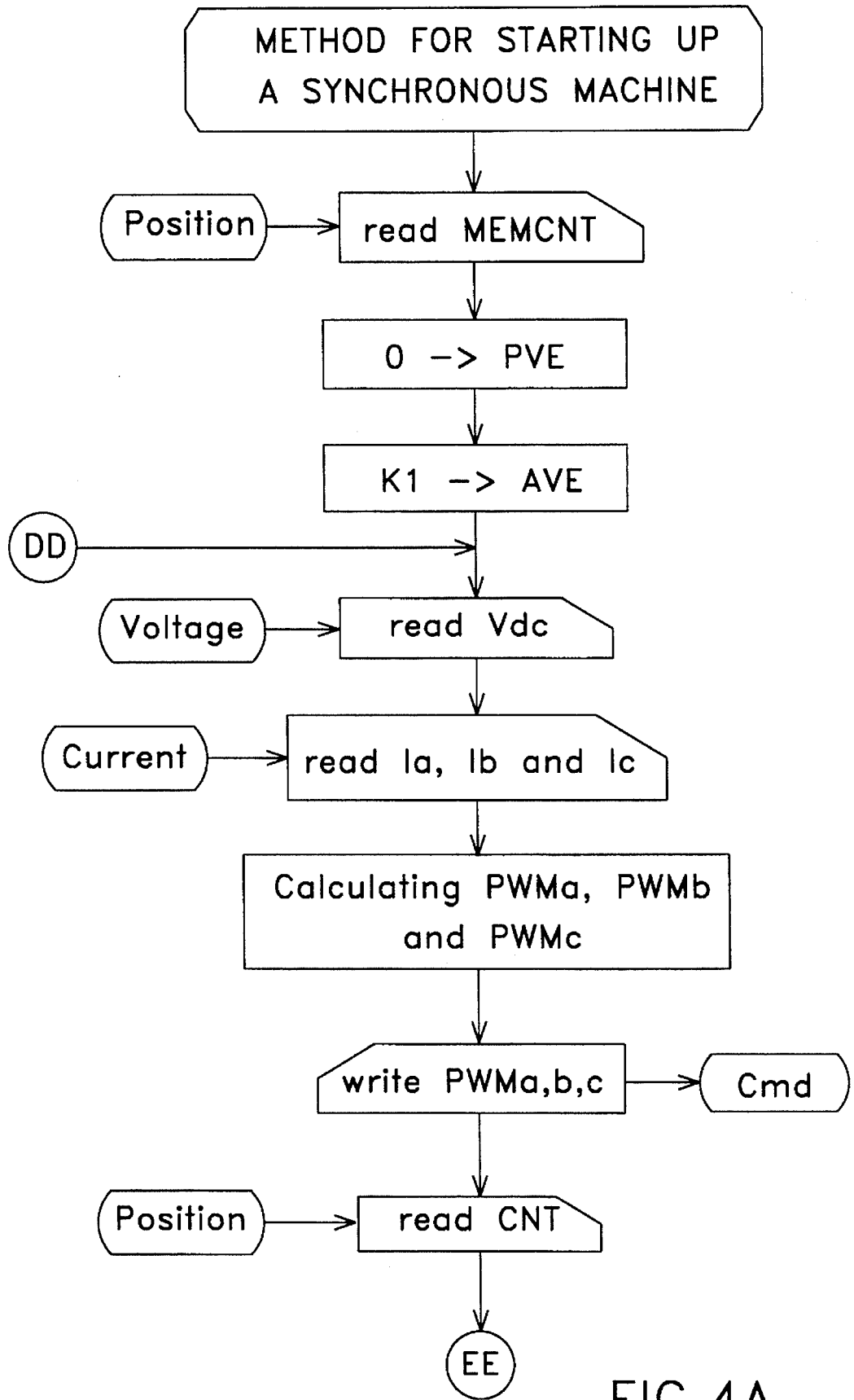
FIGS. 4A–4C are another algorithm chart showing a method for starting up a synchronous machine in accordance with the present invention.
Figure 4B:
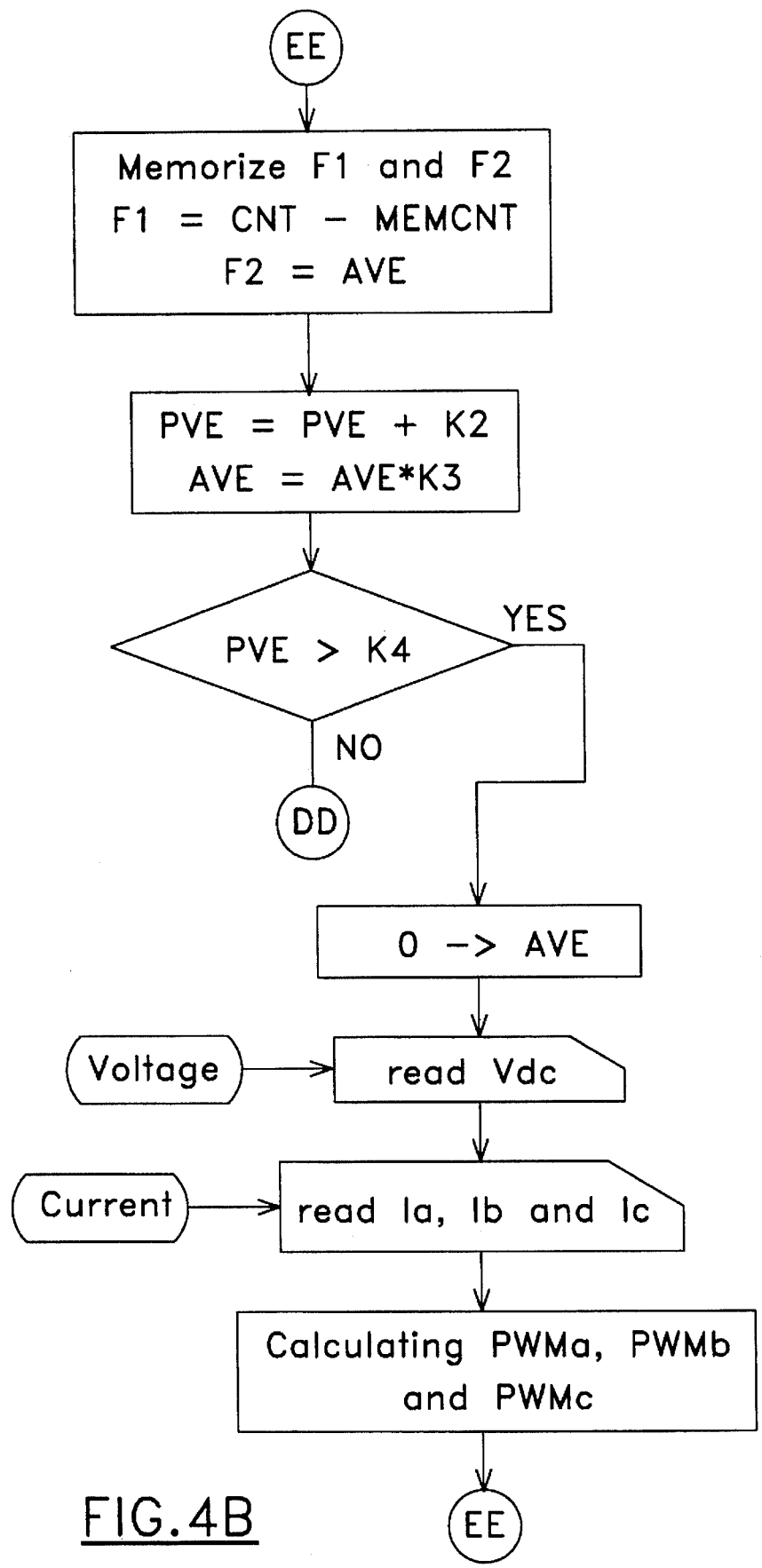
Figure 4C:
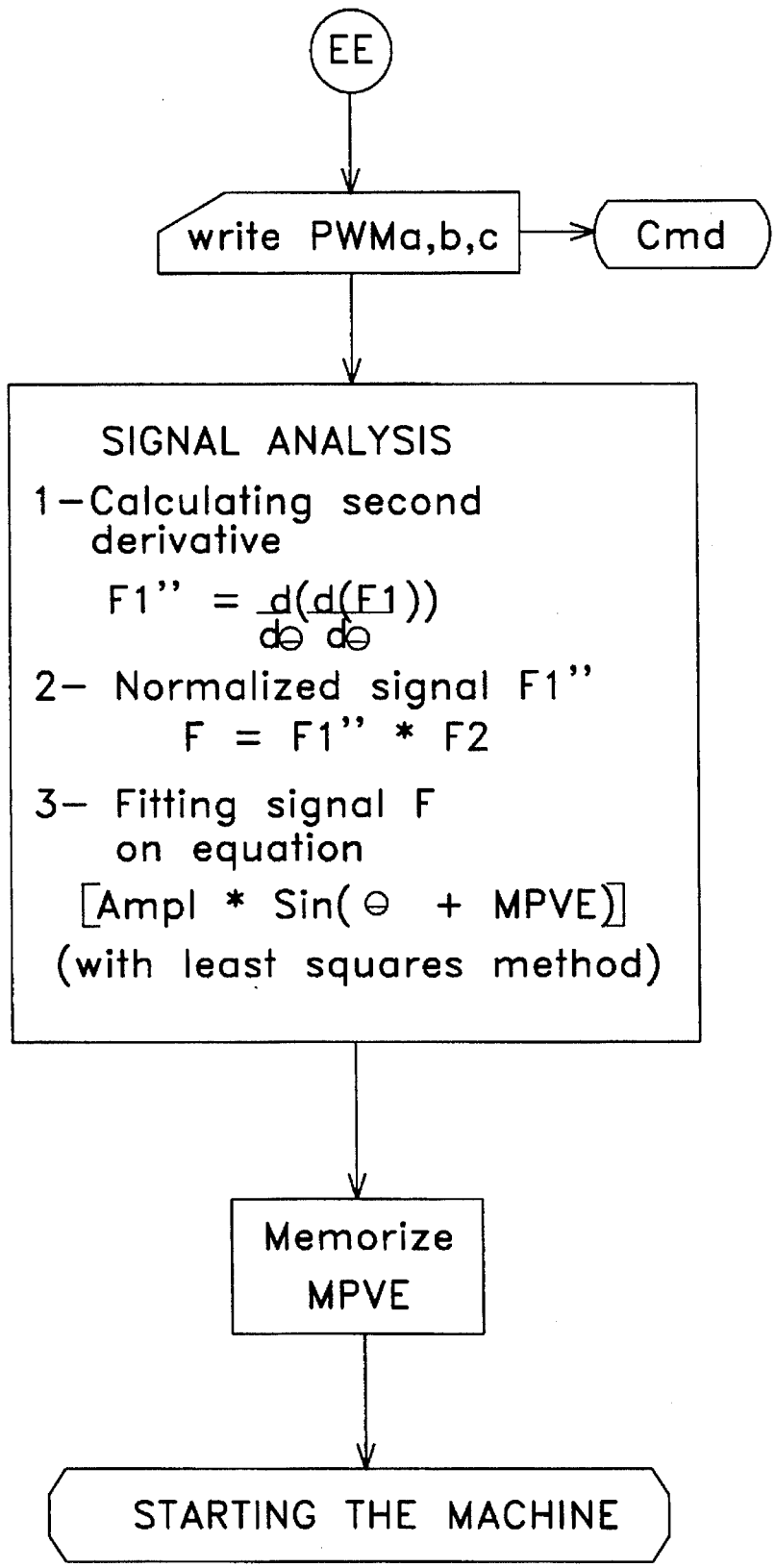

Referring now to FIGS. 4A–4C, there is shown a second method for starting up a synchronous machine having a rotor and a stator provided with a winding, which can be performed by the apparatus described above.

This second method comprises the step of (a) applying a predetermined sequence of vectorial sums of currents to the winding of the machine (2), the sequence of vectorial sums having predetermined variable phases.

Preferably, the step (a) comprises the steps of determining an arbitrary position of the rotor of the machine (2) and storing it the variable MEMCNT; (ii) storing a zero value in the variable PVE which represents a phase; (iii) storing the value of K1 in the variable AVE which represents an amplitude, K1 having for example the value of 200; (iv) detecting the value of the voltage applied to the inverter (10) and storing in the variable Vdc; (v) detecting the values of the currents applied to the machine (2) and storing them in the variables Ia, Ib and Ic, at this point these values having zero values as no current has been applied yet to the machine; (vi) calculating values of PWMa, PWMb and PWMc from the values of PVE, AVE, Vdc, Ia, Ib and Ic; (vii) producing a command signal Cmd for the inverter (10) resulting from values PWMa, PWMb and PWMc; (x) storing the value of PVE+K2 in the variable PVE where K2 is a constant and has for example the value of $10^{-6}$, and storing the value of AVE+K3 in the variable AVE where K3 has a value alternating between the value of −1 and +1 at interval of 200 μsec; and (xi) verifying whether the value of the variable PVE is greater than the value of a constant K4 having for example the value of 360° and repeating steps (iv) to (xi) as long as the condition of step (xi) is negative.

Preferably, in step (a), the predetermined sequence of vectorial sums of currents applied to the winding has predetermined variable phases which vary from a first predetermined phase value to a second predetermined phase value. For example, the first predetermined phase value is 0° and the second predetermined phase value is 360° which is the value of K4.

Preferably, in step (a), each vectorial sum of the sequence of vectorial sums of currents is applied to the winding by means of pulse-width modulated signals.

The method also comprises the step of (b) detecting and storing, for each of the vectorial sums of currents applied in step (a), a movement of the rotor and a direction thereof with respect to the stator. Preferably, the step (b) comprises, after step (vii) and before step (xi), the step of (viii) detecting position of the rotor and storing it in the variable CNT.

The method also comprises the step of (c) establishing a function F1 which represents the variations of said movements and directions of said rotor with respect to the phase of the vectorial sums of currents, and establishing a function F2 which represents the variations of the amplitudes of said vectorial sums of currents with respect to the phase of the vectorial sums of currents. Preferably, the step (c) comprises, after the step (viii) and before the step (xi), the steps of (ix) memorizing, for each value of phase of the vectorial sums of currents, functions F1 and F2 where F1=CNT−MEMCNT and F2=AVE.

When the condition of step (xi) is positive, it means that the collect of data is terminated. Accordingly the machine (2) can be stopped. The stopping of the machine (2) comprises the steps of (xii) storing a zero value in the variable AVE; (xiii) detecting the value of the voltage applied to the inverter (10) and storing it in the variable Vdc; (xiv) detecting the values of the currents applied to the machine (2) and storing them in the variables Ia, Ib and Ic; (xv) calculating values of PWMa, PWMb and PWMc from the values of PVE, AVE, Vdc, Ia, Ib and Ic; and (xvi) producing a command signal Cmd for the inverter (10) resulting from values PWMa, PWMb and PWMc. The machine is then stopped.

The method also comprises the step of (d) mathematically fitting an equation resulting from the functions F1 and F2 with a predetermined equation to obtain a phase difference which is stored in a variable MPVE, whereby the machine is ready to operate from the phase difference. Preferably, step (d) comprises the steps of (xvii) calculating second derivative F1" of the function F1 where:

$$F1" = \frac{d(d(F1))}{d\theta d\theta}$$

and (xiv) normalizing the function F1" by means of the function F2 to obtain the equation F resulting from the functions F1 and F2 by means of the following equation:

$$F=F1"*F2.$$

Preferably, the fitting of step (d) is done by means of least squares method. The predetermined equation by which the fitting of step (d) is done defines a sinus which is AMPL*Sin(θ+said phase difference) where AMPL is representative of the variable amplitude, and θ is representative of the variable phases.

Figure 2:
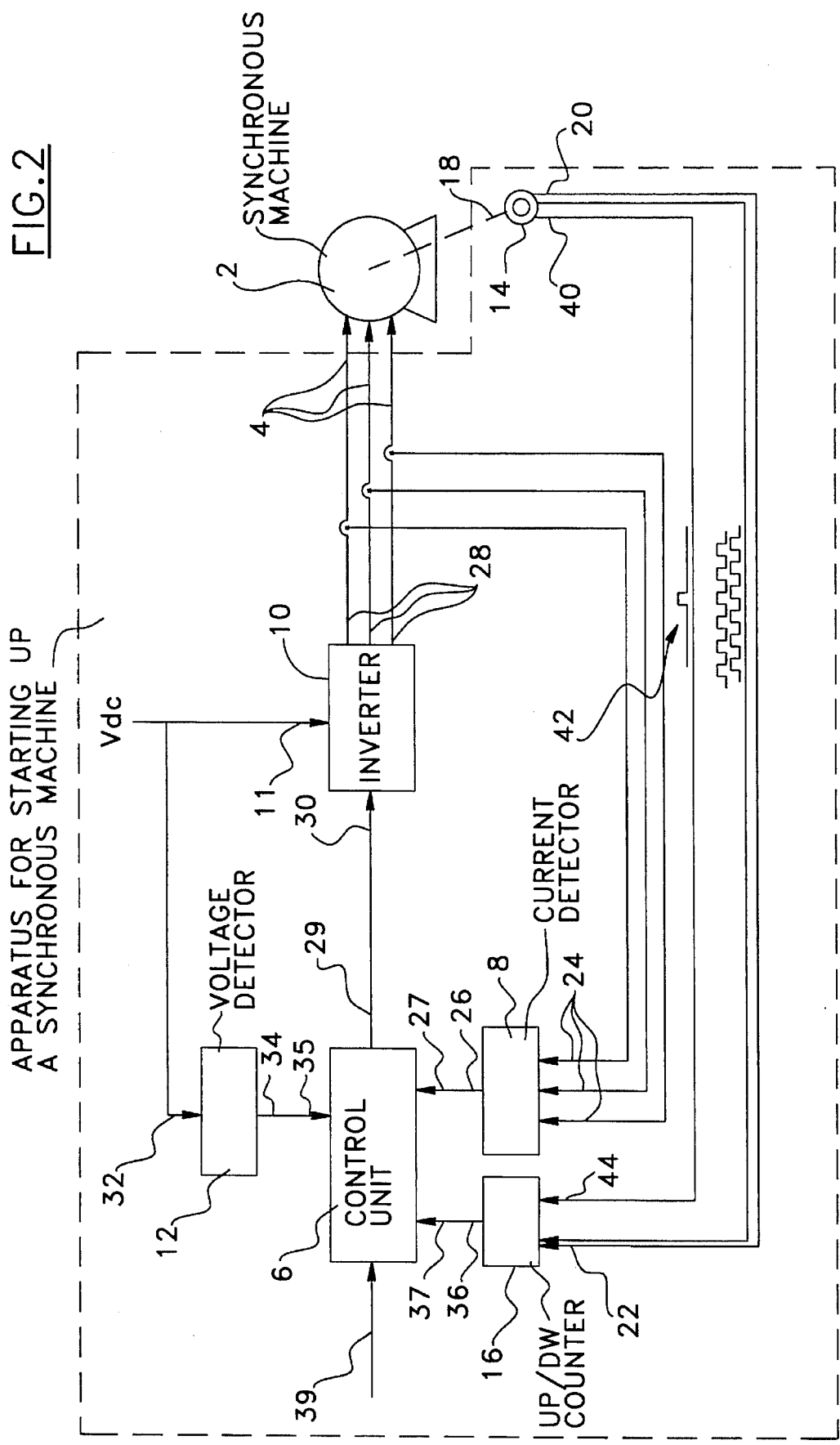
FIG. 2 is another block diagram showing an apparatus for starting up a synchronous machine in accordance with the present invention.

Referring now to FIG. 2, it can be seen that the incremental encoder (14) has a second output (40) for generating an index signal (42); and the up/down counter (16) has a loading input (44) for receiving the index signal, whereby the index signal is used as a loading signal to confirm the absolute position of the rotor with respect to the stator when the synchronous motor is running.

Figure 5A:
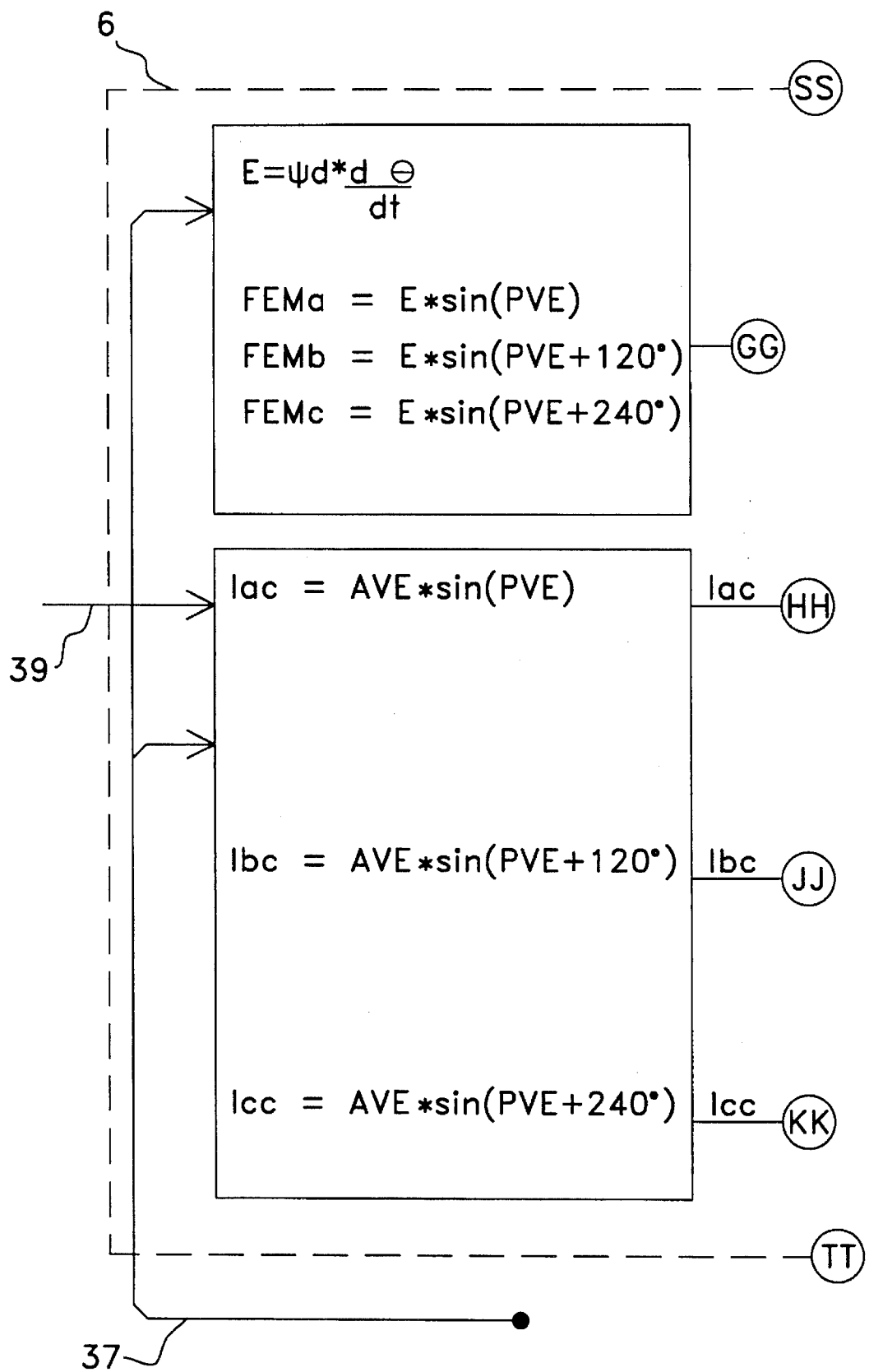
FIGS. 5A–5C are a block diagram showing with more details an element shown in FIG. 1.
Figure 5B:
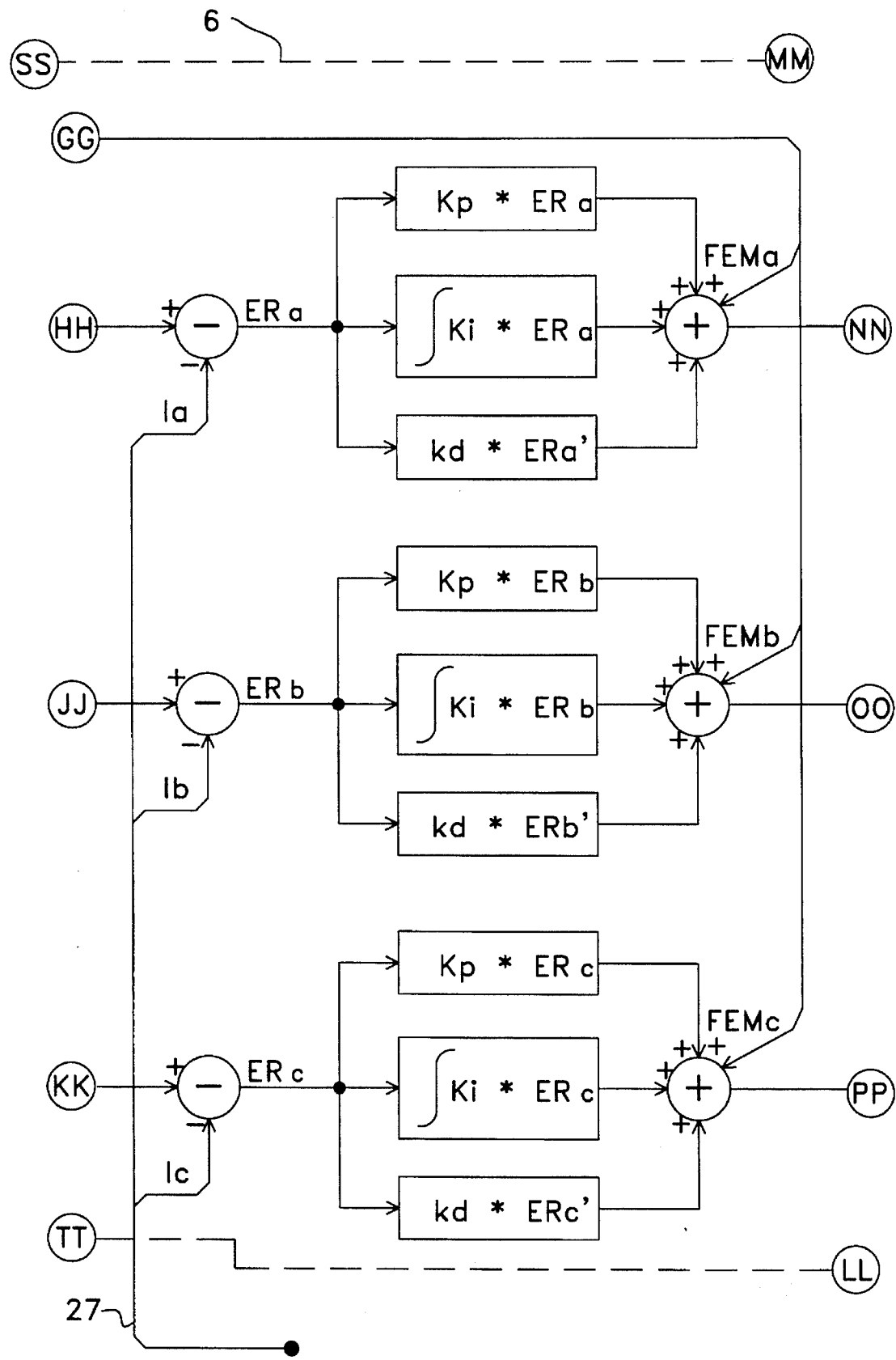
Figure 5C:
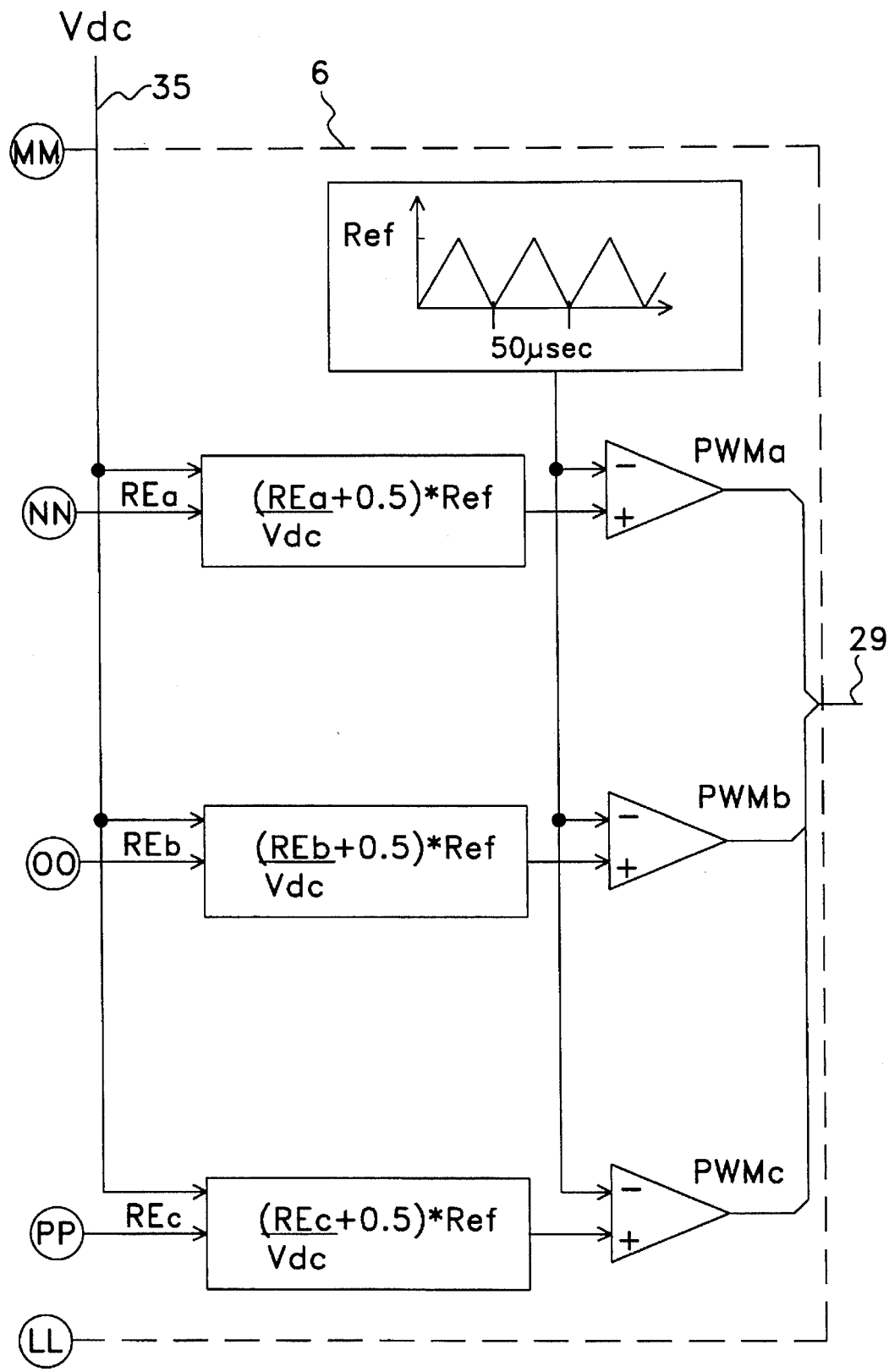

Referring now to FIGS. 5A–5C there is shown a preferable embodiment of the control unit (6) for calculating the values PWMa, PWMb and PWMc shown in FIGS. 1 and 2. The values of currents command Iac, Ibc and Icc are calculated from the values AVE and PVE derived from inputs 37 and 39. The values of back electromotive force FEMa, FEMb, and FEMc are calculated from the values PVE, θ and ψd where ψd is a constant representative of a magnetomotive force. The values of errors ERa, ERb and ERc are calculated from values of current commands Iac, Ibc and Icc and values of currents Ia, Ib and Ic. The values of REa, REb and REc are calculated by means of a PID (Proportional Integral Differential) algorithm which uses the values of FEMa, FEMb, FEMc. The values of PWMa, PWMb and PWMc are calculated from value of Vdc, REa, REb and REc and are applied to output 29.

Figure 6:
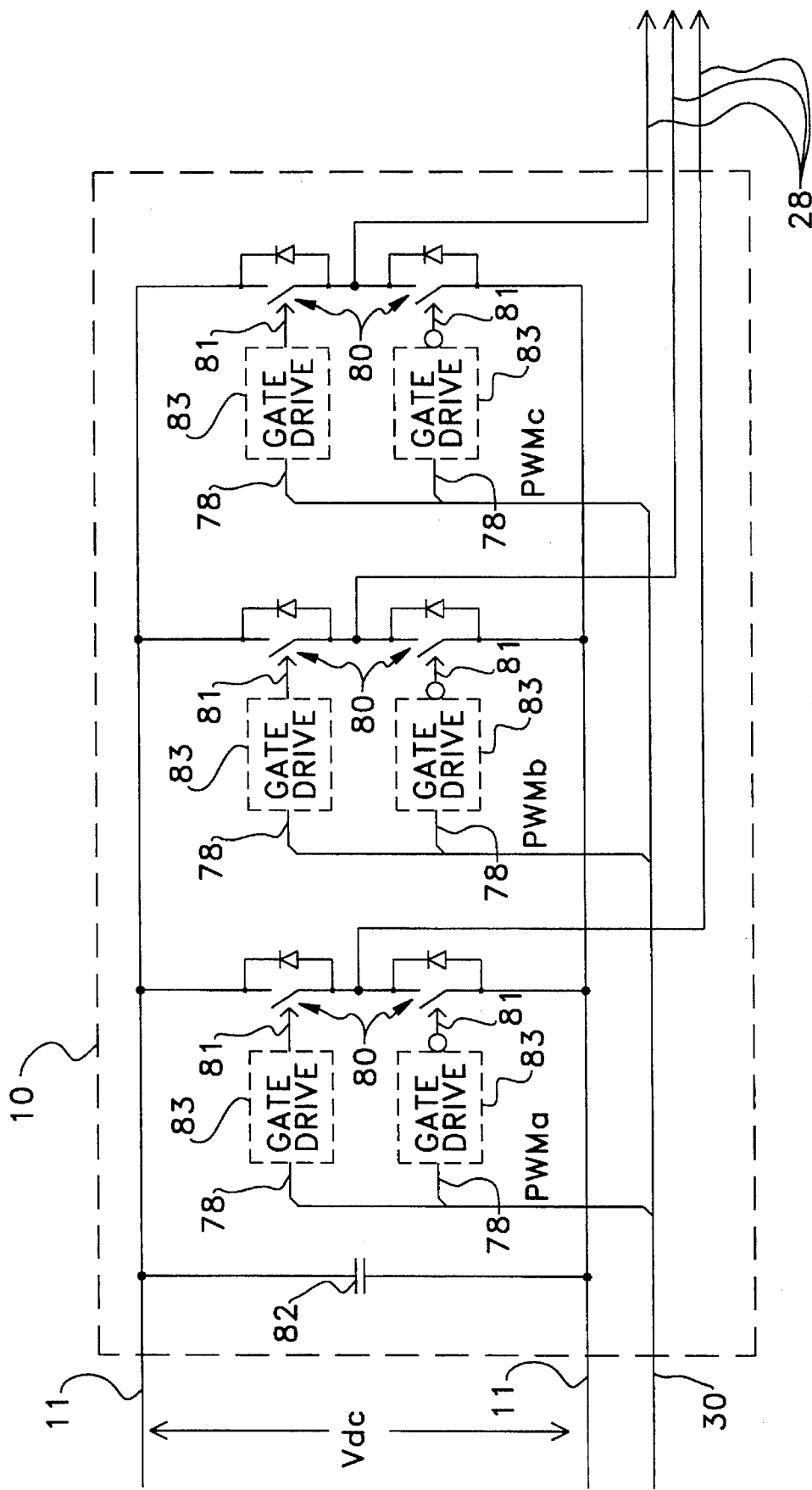
FIG. 6 is a block and circuit diagram showing with more details a portion of an element shown in FIG. 1.

Referring now to FIG. 6, there is shown a preferable embodiment of the inverter (10) shown in FIGS. 1 and 2. Power inverter (10) is used for applying currents to synchronous machine (shown in FIGS. 1 and 2) via outputs 28. Six power switches (80) of IGBT type are connected to power supply Vdc via input (11). The power switches have inputs (81) for receiving command signals from output of gate drives (83). Gate drives (83) have inputs (78) for receiving command signals PWMa, PWMb and PWMc via input 30. Power capacitor 82 is connected across input (11) to filter the power supply Vdc.

Referring now to FIG. 7, there is shown a partial cross section view of the synchronous machine. Phase windings A, B and C are mounted in stator (92). Magnets (91) are mounted in rotor (93). The MPVE value is the value of angle α between the vectorial position (94) of rotor (93) and vectorial position (95) of stator (92). The means for detecting the movement and direction of the rotor (93) with respect to the stator (92) comprise an encoded ring (97) cooperating with an encoded fixed reading head (98).

As an example, a complete listing of the software used for starting up the synchronous machine follows:

```
/*******************************************************/
/*                  programme MOT                      */
/*******************************************************/

     static unsigned int *CONTMIX=(unsigned int*)0x800000u;
        /*Contr.Mix Bus */
     static unsigned int *CONTACQ   = (unsigned int *)0x804000u;
        /*Contr.Carteacq*/
     static unsigned int *CONTDMA   = (unsigned int *)0x808000u;
        /*Contr.DMA     */
     static unsigned int *CONTIM1   = (unsigned int *)0x808030u;
        /*Contr.Timer1  */ include <v:\SOURCE\MOT\VMOTOV31.H> /*insert vecteur VECT */
     #include <v:\SOURCE\MOT\SINU1.H>  /* insert vecteur SINUS */ static VVV    *VECT1;            /* definir pointeur VECT1*/
     static float  *SINUS;            /* definir pointeur SINUS*/

     extern INT_02();                 /*definir pointeur inter.*/

/*******************************************************/
/******** DEBUT PROGRAMME CALCUL 20KHz ****************/
/*******************************************************/
     INT_02()
        {

/*********** RESET ET DISABLE INT.#02 ***************/
```

```
        asm("      LDI   0Ah         ,R0  ");
        asm("      STI   R0          ,*AR0");
           /* enable reset INT MIX 4283 */

    /************ PULSE TIMER #01 OUT A ON  **********/ asm("      LDI   206h        , R7  ");
        asm("      STI   R7          ,*AR5 ");

      /*  TRANSFERT DMAOUT                         */
      #include <v:\SOURCE\MOT\DMAOUT.H>

/*  ACQUISITION DE LA POSITION              */
      #include <v:\SOURCE\MOT\ACQPOS20.H>

/*  ACQUISITION DE LA VITESSE ET ACCEL.     */
      #include <v:\SOURCE\MOT\ACQVIAC2.H>

/*  CALCUL DE AMPL                          */
      #include <v:\SOURCE\MOT\CALAMP.H>

/*  CALCUL DE Iac Ibc ET Icc                */
      #include <v:\SOURCE\MOT\CALIABC.H>

      /*  ACQUISITION DE Iabc ET NORMALISATION    */
      #include <v:\SOURCE\MOT\ACQIABC.H>

/*  INITIALISATION CALCUL OFFSET            */
      #include <v:\SOURCE\MOT\INIOFFS.H>
      /*  ORGANE DE REGULATION                    */
      #include <v:\SOURCE\MOT\CALPID.H>

/*  CALCUL DE FEM EA,EB,EC                  */
      #include <v:\SOURCE\MOT\CALFEM.H>
```

```
    /*  ACQUISITION DE Vdc ET NORMALISATION    */
    #include <v:\SOURCE\MOT\ACQVDC.H>

/*  ACQUISITION DE COUPLE ET NORMALISATION */
    #include <v:\SOURCE\MOT\ACQCOUP.H>

/*  CALCUL DE VAC                          */
    #include <v:\SOURCE\MOT\CALVABC.H>

    /*  CALCUL POUR OUT FPGA                   */
    #include <v:\SOURCE\MOT\OUTFPGA.H>

/*  transfert DMAIN                        */
    #include <v:\SOURCE\MOT\DMAIN.H>
    /*  PULSE TIMER #01 OUT A OFF              */ asm("NDMAIN  LDI   202h      , R7   ");
    asm("        STI   R7        ,*AR5  ");
    /*  ENABLE INTERRUPT MIX ET C30            */ asm("        LDI   0         ,IF   ");
    asm("        LDI   14        ,R0   ");/*enable INT MIX 4283*/
    asm("        STI   R0        ,*AR0");
    asm("        OR    2000h     ,ST   "); /* set GIE enable   */

)
    /*******************************************************/
    /*******    FIN PROGRAMME CALCUL 20KHz   ***************/
    /*******************************************************/
    main()
    {
        SINUS = SINUS1;  /*l'adr. de depart de SINUS*/
        VECT1 = &VECT;   /*l'adr. de depart de VECT */
```

```
        /******** INIT. EXPANSION BUS ET VECT. INT. #02 **********/

*(unsigned int *)0x808060 = 0x78;/* exp. bus wait state=3 */
        *(unsigned int *)0x809808 = (int)&INT_02 | 0x60000000;
             /* set vect.int02*/

/*    TRANSFERT VECTEUR DANS DRAM          */
        #include <v:\SOURCE\MOT\TRANVEC.H>

        /*    SET L'ADRESSE DES POINTEURS          */
        #include <v:\SOURCE\MOT\SETADD.H>

/*    INIT. CARTE D'ACQUISITION            */
        #include <v:\SOURCE\MOT\INIACQ.H>
        /*    DEPART DU SYSTEME INTERRUPT          */
        #include <v:\SOURCE\MOT\DEPINT.H>

/********     boucle sans fin         ****************/
        asm("LAB1:   NOP");
        asm("        NOP");
        asm("        NOP");
        asm("        BRD     LAB1");
        asm("        NOP");
        asm("        NOP");
        asm("        NOP");
        asm("        NOP");

}
        typedef struct
        {
        /****************** CONSIGNES   ******************/
        /* 0  */ unsigned int              STATUS_VE;
        /* 1  */         float Tcons;
        /* 2  */         float             Pdisp;
        /* 3  */         float             X3;
```

```
        /*  4   */            float   Vcons;
        /* motf.c */
        /*  5   */ unsigned int      Phase;
        /*  6   */            float   kteta;
        /* initenc */
        /*  7   */            float   tinc;
        /* initenc */
        /*  8   */            float   tpred;
        /* initenc */
        /*  9   */            float   _Inert;
        /* motfl.c */
        /* 10   */            float   IntW;
        /* motf.c */
        /* 11   */            float   KpW;
        /* motf.c */
/****************** CONSTANTES ******************/
        /* 12   */            float   KP;
        /* 13   */            float   KPTETA;
        /* INITENC */
        /* 14   */            float   KD2;
        /* 15   */            float   OFS_X;
        /* 16   */            float   KI1;
        /* 17   */            float   Imax;
        /* 18   */            float   Cphase;
        /* 19   */            float   XVdc;
        /* 20   */            float   KOUT1;
        /* 21   */            float   KOUT2;
        /* 22   */            float   BORNE_I;
        /* 23   */            float   NO_Iabce;
        /* 24   */            float   NO_Dist;
        /* 25   */            float   NO_Temps;
        /* 26   */            float   NO_Vdce;
        /* 27   */            float   PSI;
        /* 28   */            float   AVA_PHASE;
        /* 29   */            float   _15PSI;
        /* 30   */            float   NO_Tc;
```

```
            /* 31  */         float   NO_Temp1;
/* motf1.c */
            /* 32  */         float   NO_Temp2;
/* motf1.c */
            /* 33  */ unsigned int              X33;
            /* 34  */ unsigned int              X34;
            /* 35  */ unsigned int              X35;
            /* 36  */ unsigned int              X36;
            /* 37  */ unsigned int              X37;
            /* 38  */ unsigned int V_vecom;
            /* 39  */ unsigned int V_prog;
            /* 40  */ unsigned int V_vers;
            /* 41  */ unsigned int              X41;
            /* 42  */ unsigned int              X42;
            /* 43  */ unsigned int              X43;
            /* 44  */ unsigned int              X44;
            /* 45  */ unsigned int              X45;
            /* 46  */ unsigned int              X46;
            /* 47  */ unsigned int              X47;
            /* 48  */ unsigned int              X48;
            /* 49  */ unsigned int              X49;
            /* 50  */ unsigned int              X50;
            /* 51  */ unsigned int              X51;
            /* 52  */         float   emboit;
            /* 53  */         float   BorneIN;                  /* motf.c */
            /* 54  */         float   Filte1;
            /* 55  */         float   Filte2;
            /* 56  */         float   Periode;
            /* 57  */         float   X_INTEG;
            /* 58  */ unsigned int VECT_DRAM;
            /* 59  */ unsigned int ADR_OSCIL;
            /* 60  */ unsigned int              X60;
            /* 61  */ unsigned int PROGCARTEACQUIT;
            /* 62  */ unsigned int LIRECARTEPROT;
            /* 63  */ unsigned int LIRECARTEACQUIT;
/******************* MESURE CALCUL ****************/
```

```
/*  64  */ unsigned int          STATUS_MR;
/*  65  */          float   dPmec;
/*  66  */          float   Wmec;
/*  67  */          float   Amec;
/*  68  */          float   Treel;
/*  69  */          float   TcW;                /* motf.c */
/*  70  */          float           Temp_r;
/*  71  */          float           Temp_s;
/*  72  */          float   Vdc;
/*  73  */ unsigned int     EnerP;
/*  74  */ unsigned int     EnerN;
/*  75  */          float   Iq;
/*  76  */          float   Puis;
/*  77  */          float           X77;
/*  78  */          float           X78;
/*  79  */          float   TETAF;
/*  80  */          float   Temp1;              /* motf1.c */
/*  81  */          float   Temp2;              /* motf1.c */
/*  82  */          float           X82;
/*  83  */          float   Tcons1;
/***************** VARIABLES *****************/
/*  84  */          float   IA;
/*  85  */          float   IB;
/*  86  */          float   IC;
/*  87  */ unsigned int     TETA;
/*  88  */          float   EA;
/*  89  */          float   EB;
/*  90  */          float   EC;
/*  91  */          float   IAC;
/*  92  */          float   IBC;
/*  93  */          float   ICC;
/*  94  */          float           X94;
/*  95  */          float           X95;
/*  96  */          float           X96;
/*  97  */          float   VAC;
/*  98  */          float   VBC;
```

```
/*  99 */          float    VCC;
/* 100 */          float    IMVA;
/* 101 */          float    IMVB;
/* 102 */          float    IMVC;
/* 103 */          float    prot_dcmax;
/* 104 */          float    prot_dcmin;
/* 105 */          float    prot_dc;
/* 106 */ unsigned int               X106;
/* 107 */ unsigned int               X107;
/* 108 */ unsigned int               X108;
/* 109 */ unsigned int               X109;
/* 110 */ unsigned int      TRIG_OSCIL;
/* 111 */ unsigned int      CALVIT;
/* 112 */ unsigned int      CntEnerg;
/* 113 */ unsigned int      TETA_INI;       /* initenc */
/* 114 */          float    SomEnerP;
/* 115 */          float    SomEnerN;
/* 116 */          float    DTET;           /* INITENC */
/* 117 */          float    teta_SOM;       /* initenc */
/* 118 */          float    tsom;           /* initenc */
/* 119 */ unsigned int      DTETAVI;
/* 120 */ unsigned int      COMPT_OSCIL;
/* 121 */          float    SOM_OFSIA;
/* 122 */          float    SOM_OFSIB;
/* 123 */          float    SOM_OFSIC;
/* 124 */ unsigned int      CAL_OFS;
/* 125 */          float    _Vdc;
/* 126 */          float    INTW;           /* motf.c */
/* 127 */          float               X127;
/* 128 */          float    ERAD1;
/* 129 */          float    ERBD1;
/* 130 */          float    ERCD1;
/* 131 */          float    ERAED1;
/* 132 */          float    ERBED1;
/* 133 */          float    ERCED1;
/* 134 */          float    OFS_IA;
```

```
/* 135 */        float  OFS_IB;
/* 136 */        float  OFS_IC;
/* 137 */        float  ERAEI1;
/* 138 */        float  ERBEI1;
/* 139 */        float  ERCEI1;
}VVV;

static VVV VECT =
    (
/****************** CONSIGNES ******************/
/*  0     unsigned int      STATUS_VE; */   0,
/*  1            float       Tcons;    */   0.0,
/*  2            float                 Pdisp; */ 0.0,
/*  3            float                 X3;    */ 0.0,
/*  4            float       Vcons;    */       0.0,
/* motf.c */
/*  5     unsigned int       Phase;    */       182,
/*  6            float       kteta;    */       -6E-3,
/* initenc */
/*  7            float       tinc;     */       2E-2,
/* initenc */
/*  8            float       tpred;    */       300.0,
/* initenc */
/*  9            float       _Inert;   */       18.4E-3,
/* 10            float       IntW;     */       0.010,
/* motf.c */
/* 11            float       KpW;      */       30.0,
/* motf.c */
/****************** CONSTANTES ******************/
/* 12            float       KP;       */       1.5,
/* 13            float       KPTETA;   */       -5.0,
/* 14            float       KD2;      */       0.0,
/* 15            float       ofs_x;    */       -0.001,
/* 16            float       KI1;      */       0.5,
/* 17            float       Imax;     */       350.0,
/* 18            float       Cphase;   */       0.041,
```

```
/* 19        float    XVdc;             */   0.48,
/* 20        float    KOUT1;            */   512.0,
/* 21        float    KOUT2;            */   255.5,
/* 22        float    BORNE_I;          */   40.0,
/* 23        float    NO_Iabc;          */   -0.183,
/* 24        float    NO_Dist;          */
1.53398E-3,
/* 25        float    NO_Temps;         */
100.0,/*195.3125E-9,12msec.*/
/* 26        float    NO_Vdce;          */   0.31279,
/* 27        float    PSI;              */   2.6089,
/* 28        float    AVA_PHASE;        */   0.048,
/* 29        float    _1.5PSI;          */   0.24867,
/* 30        float    NO_Tc;            */   0.0,
/* 31        float    NO_Temp1;         */   0.24425,
   /* motf1.c */
/* 32        float    NO_Temp2;         */   0.24425,
   /* motf1.c */
/* 33        unsigned int              X33; */   0,
/* 34        unsigned int              X34; */   0,
/* 35        unsigned int              X35; */   0,
/* 36        unsigned int              X36; */   0,
/* 37        unsigned int              X37; */   0,
/* 38        unsigned int    V_vecom;   */   9410200,
/* 39        unsigned int    V_prog;    */   31010,
/* 40        unsigned int    V_vers;    */   31000,
/* 41        unsigned int              X41; */   0,
/* 42        unsigned int              X42; */   0,
/* 43        unsigned int              X43; */   0,
/* 44        unsigned int              X44; */   0,
/* 45        unsigned int              X45; */   0,
/* 46        unsigned int              X46; */   0,
/* 47        unsigned int              X47; */   0,
/* 48        unsigned int              X48; */   0,
/* 49        unsigned int              X49; */   0,
/* 50        unsigned int              X50; */   0,
```

```
      /* 51    unsigned int              X51; */    0,
      /* 52           float   emboit;         */    0.04,
      /* 53           float   BorneIW;        */    600.0,
   /* motf.c */
   /* 54           float   Filtre1;           */    0.05,
   /* 55           float   Filtre2;           */    0.95,
   /* 56           float   Periode;           */    50.0e-6,
   /* 57               float  X_INTEG;        */
   0.333333,
   /* 58    unsigned int    DRAMIN ;          */
   0x200002,
   /* 59    unsigned int    ADR. OSCIL.;      */
   0x200100,
   /* 60    unsigned int              X60; */    0x0,
   /* 61    unsigned int    PROG.CARTE ACQU.; */    0x18000,
   /* 62    unsigned int    LIRE CARTE PROT.; */    0x10000,
   /* 63    unsigned int    LIRE CARTE ACQU.; */    0x38000,
   /***************** MESURE CALCUL *************/
   /* 64    unsigned int    STATUS_MR;        */    0,
   /* 65           float   dPmec;             */    0.0,
   /* 66           float   Wmec;              */    0.0,
   /* 67           float   Amec;              */    0.0,
   /* 68           float   Treel;             */    0.0,
   /* 69           float   Tcw;               */    0.0,
   /* mot.c */
   /* 70           float           Temp_r;    */    0.0,
   /* 71           float           Temp_s;    */    0.0,
   /* 72           float   Vdc;               */    0.0,
   /* 73    unsigned int    EnerP;            */    0,
   /* 74    unsigned int    EnerN;            */    0,
   /* 75           float   Iq;                */    0.0,
   /* 76           float   Puis;              */    0.0,
   /* 77           float           X77;       */    0.0,
   /* 78           float           X78;       */    0.0,
   /* 79           float   TETAF;             */    0.0,
   /* 80           float   Temp1;             */    0.0,
```

```
/* motf1.c */
/* 81            float      Temp2;                */   0.0,
/* motf1.c */
/* 82            float                 X82; */        0.0,
/* 83            float      Tcon1;                */   0.0,
/****************** VARIABLES ******************/
/* 84            float      IA;                   */   0.0,
/* 85            float      IB;                   */   0.0,
/* 86            float      IC;                   */   0.0,
/* 87   unsigned int        TETA;                 */   0,
/* 88            float      EA;                   */   0.0,
/* 89            float      EB;                   */   0.0,
/* 90            float      EC;                   */   0.0,
/* 91            float      IAC;                  */   0.0,
/* 92            float      IBC;                  */   0.0,
/* 93            float      ICC;                  */   0.0,
/* 94            float                 X94; */       -4.31,
/* 95            float                 X95; */        4.31,
/* 96            float                 X96; */        0.0,
/* 97            float      VAC;                  */   0.0,
/* 98            float      VBC;                  */   0.0,
/* 99            float      VCC;                  */   0.0,
/* 100           float      IMVA;                 */   0.0,
/* 101           float      IMVB;                 */   0.0,
/* 102           float      IMVC;                 */   0.0,
/* 103           float      prot_dcmax;           */   550.0,
/* 104           float      prot_dcmin;           */   500.0,
/* 105           float      prot_dc;              */   490.0,
/* 106  unsigned int                   X106;*/        0,
/* 107  unsigned int                   X107;*/        0,
/* 108  unsigned int                   X108;*/        0,
/* 109  unsigned int                   X109;*/        0,
/* 110  unsigned int        TRIG_OSCIL;           */   0,
/* 111  unsigned int        CALVIT;               */   0,
/* 112  unsigned int        CntEnerg;             */   0,
/* 113  unsigned int        TETA_INI;             */   0,
```

```
/*  114    float           SomEnerP;       */  0.0,
/*  115    float           SomEnerN;       */  0.0,
/*  116    float           DTET            */  0.0,
/* INITENC */
/*  117    float           teta_SOM;       */  0.0,
/* initenc */
/*  118    float           tsom;           */  0.0,
/* initenc */
/*  119    unsigned int    DTETAVI;        */  0,
/*  120    unsigned int    COMPT_OSC;      */  0,
/*  121    float           SOM_OFSIA;      */  0,
/*  122    float           SOM_OFSIB;      */  0,
/*  123    float           SOM_OFSIC;      */  0,
/*  124    unsigned int    CAL_OFS;        */  1001,
/*  125             float  1/Vdc;          */  0,
/*  126             float  IntW;           */  0.0, /* motf.c */
/*  127             float           X127;*/  0.0,
/*  128             float  ERAD1;          */  0.0,
/*  129             float  ERBD1;          */  0.0,
/*  130             float  ERCD1;          */  0.0,
/*  131             float  ERAED1;         */  0.0,
/*  132             float  ERBED1;         */  0.0,
/*  133             float  ERCED1;         */  0.0,
/*  134             float  OFS_IA;         */  0.0,
/*  135             float  OFS_IB;         */  0.0,
/*  136             float  OFS_IC;         */  0.0,
/*  137             float  ERAEI1;         */  0.0,
/*  138             float  ERBEI1;         */  0.0,
/*  139             float  ERCEI1;         */  0.0
    );

0.0000,
    0.0246,
    0.0493,
    0.0739,
```

0.0984,
0.1229,
0.1473,
0.1716,
0.1958,
0.2199,
0.2439,
0.2677,
0.2914,
0.3149,
0.3382,
0.3612,
0.3841,
0.4067,
0.4291,
0.4512,
0.4731,
0.4947,
0.5159,
0.5369,
0.5575,
0.5778,
0.5977,
0.6173,
0.6365,
0.6553,
0.6737,
0.6917,
0.7093,
0.7264,
0.7431,
0.7594,
0.7752,
0.7905,
0.8054,
0.8197, 0.8336,
0.8470,
0.8598,
0.8721,
0.8839,
0.8952,
0.9059,
0.9160,
0.9256,
0.9347,
0.9432,
0.9511,
0.9584,
0.9651,
0.9713,
0.9768,
0.9818,
0.9862,
0.9900,
0.9932,
0.9957,
0.9977,
0.9991,
0.9998,
1.0000,
0.9995,
0.9985,
0.9968,
0.9945,
0.9916,
0.9882,
0.9841,
0.9794,
0.9741,
0.9683,
0.9618, 0.9548,
0.9472,
0.9390,
0.9302,
0.9209,
0.9110,
0.9006,
0.8896,
0.8781,
0.8660,
0.8534,
0.8403,
0.8267,
0.8126,
0.7980,
0.7829,
0.7674,
0.7513,
0.7348,
0.7179,
0.7005,
0.6827,
0.6645,
0.6459,
0.6269,
0.6075,
0.5878,
0.5677,
0.5472,
0.5264,
0.5053,
0.4839,
0.4622,
0.4402,
0.4180,
0.3955, 0.3727,
0.3497,
0.3265,
0.3032,
0.2796,
0.2558,
0.2319,
0.2079,
0.1837,
0.1595,
0.1351,
0.1107,
0.0861,
0.0616,
0.0370,
0.0123,
-0.0123,
-0.0370,
-0.0616,
-0.0861,
-0.1107,
-0.1351,
-0.1595,
-0.1837,
-0.2079,
-0.2319,
-0.2558,
-0.2796,
-0.3032,
-0.3265,
-0.3497,
-0.3727,
-0.3955,
-0.4180,
-0.4402,
-0.4622,

−0.4839,
−0.5053,
−0.5264,
−0.5472,
−0.5677,
−0.5878,
−0.6075,
−0.6269,
−0.6459,
−0.6645,
−0.6827,
−0.7005,
−0.7179,
−0.7348,
−0.7513,
−0.7674,
−0.7829,
−0.7980,
−0.8126,
−0.8267,
−0.8403,
−0.8534,
−0.8660,
−0.8781,
−0.8896,
−0.9006,
−0.9110,
−0.9209,
−0.9302,
−0.9390,
−0.9472,
−0.9548,
−0.9618,
−0.9683,
−0.9741,
−0.9794,

-0.9841,
-0.9882,
-0.9916,
-0.9945,
-0.9968,
-0.9985,
-0.9995,
-1.0000,
-0.9998,
-0.9991,
-0.9977,
-0.9957,
-0.9932,
-0.9900,
-0.9862,
-0.9818,
-0.9768,
-0.9713,
-0.9651,
-0.9584,
-0.9511,
-0.9432,
-0.9347,
-0.9256,
-0.9160,
-0.9059,
-0.8952,
-0.8839,
-0.8721,
-0.8598,
-0.8470,
-0.8336,
-0.8197,
-0.8054,
-0.7905,
-0.7752,

−0.7594,
−0.7431,
−0.7264,
−0.7093,
−0.6917,
−0.6737,
−0.6553,
−0.6005,
−0.6173,
−0.5977,
−0.5778,
−0.5575,
−0.5369,
−0.5159,
−0.4947,
−0.4731,
−0.4512,
−0.4291,
−0.4067,
−0.3841,
−0.3612,
−0.3382,
−0.3149,
−0.2914,
−0.2677,
−0.2439,
−0.2199,
−0.1958,
−0.1716,
−0.1473,
−0.1229,
−0.0984,
−0.0739,
−0.0493,
−0.0246,
−0.0246,

```
/****** TRANSFERT VECTEUR C30 AU FONCTION VEHICULE ******/
/* prepare transfert vecteur vers fonction vehicule */
    asm("       LDI  @_VECT+58    ,AR7 ");
        /* store ad. DRAM -> AR7  */
    asm("       LDI  0h            ,BK  ");
    asm("       STI  BK           ,*+AR2(0)");
    asm("       ADDI 64            ,AR7 ");
        /* set adr.DESTDMA=200042 */
    asm("       STI  AR7          ,*+AR2(6)");
        /* store DESTDMA -> AR2(6)*/
    asm("       LDI  AR4           ,AR7 ");
    asm("       ADDI 64            ,AR7 ");
        /*set adr.SRCDMA=@VECT+40h*/
    asm("       STI  AR7          ,*+AR2(4)");
        /* store SRCDMA  -> AR2(4)*/
    asm("       LDI  40            ,R7  ");
    asm("       STI  R7           ,*+AR2(8)");
        /* store n=40 dans  AR2(8)*/
    asm("       LDI  0C53h         ,R7  ");
    /* verifi si j'ai le droit d'ecrire */
    asm("       LDI  @_VECT+58    ,AR7 ");
        /* store ad. DRAM -> AR7  */
    asm("       LDI  0fh           ,R1  ");
    asm("       CMPI *-AR7(2)      ,R1  ");
        /* 0fh - mem(20 0000)      */
    asm("       BN   DMAOUT             ");

/* lance le transfert si < 10 */
    asm("       STI  R7           ,*+AR2(0)");
        /* store config.DMA AR2(0)*/

/* watch dog laisse une trace */
    asm("       LDI  3h            ,R7  ");
    asm("       STI  R7           ,*-AR7(2) ");
```

```
/****    ACQUISITION DE LA POSITION        **/ asm("DMAOUT   LDI    *+AR1(0)    ,R1 ");
        /* acquis. de POSI.(FPGA) */
    asm("         LDI    R1          ,IR0 ");
        /* store dans IR0           */

/*asm("        ADDI   @_VECT+5    ,IR0 ");*/
    asm("         ADDI   172         ,IR0 ");
    asm("         AND    0FFh        ,IR0 ");
        /* normal. a 8 bits         */

/*(INIT. ENCODEUR) SI VOIE INDEX, RESET Teta_comp. ET
    BIT_MR(2)=1*/
    asm("         LDF    @_VECT+118  ,R2 ");
        /* TSOM       -> R2          */
    asm("         LDF    @_VECT+117  ,R3 ");
        /* TETA_SOM -> R3            */
    asm("         LDF    R3          ,R6 ");
    asm("         LDI    0           ,R4 ");
        /* ST_MR                     */

/***** TEST SI INDEX *****/
    asm("         LSH    -27         ,R1 ");

/***** OUI INDEX *****/
    asm("         LDFC   0           ,R2 ");
        /* 0 -> TSOM                 */
    asm("         LDFC   0           ,R3 ");
        /* 0 -> TETA_SOM             */
    asm("         LDIC   4           ,R4 ");
        /* BIT_MR(2) = 1             */

/***** TEST SI INITIALISATION *****/
    asm("         LDI    @_VECT+0    ,R1 ");
        /* NAND 64 -> R1             */
```

```
        asm("         ANDN    @_VECT+64   ,R1 ");
            /* 0 AND 64 -> R1              */
        asm("         LSH     -3          ,R1 ");
            /* SI INIT BRANCHE INITEN      */
        asm("         BC      INITEN         ");

/***** NON INITIALISATION *****/
        asm("         LDF     0           ,R2 ");
            /* 0 -> TSOM                   */
        asm("         BR      NOINIT1        ");
            /* BRANCHE NOINIT1             */

/***** OUI INITIALISATION *****/
        asm("INITEN   LDI     @_VECT+113  ,R5 ");
            /* TETA_INIT -> R5             */
        asm("         CMPF    0           ,R2 ");
            /* TSOM - 0                    */

/***** SI DEPART INITIALISATION *****/
        asm("         LDIEQ   IR0         ,R5 ");
            /*SITSOM=0,IR0->TETA_INIT */
        asm("         LDFEQ   0           ,R3 ");
            /* 0 -> TETA_SOM               */

        /***** INTEGRAL TETA ET COUPLE *****/
        asm("         SUBI3   R5,IR0      ,R7 ");
            /* TETA-TETA_INIT -> R7        */
            /* COMPENSE DELTA TETA */
        asm("         LDI     0           ,R6 ");
        asm("         CMPI    7Fh         ,R7 ");
        asm("         LDIP    -100h       ,R6 ");
        asm("         CMPI    -7Fh        ,R7 ");
        asm("         LDIN    100h        ,R6 ");
        asm("         ADDI    R6          ,R7 ");
            /* delta teta -> R7            */
```

```
            /* SI DELTA_TETA >10, TETA_INIT = IR0 */
       asm("        ABSI    R7          ,R6 ");
            /* ABSOLU(delta teta) -> R6*/
       asm("        CMPI    10          ,R6 ");
            /* R6 - 10                   */
       asm("        LDIP    IR0         ,R5 ");
            /*SI POSITIF, TETA_INIT=IR0*/
       asm("        LDIP    0           ,R7 ");
            /*SI POSITIF, DELTA_TETA=0 */
      asm("        LDFP    10          ,R2 ");
       asm("        FLOAT   R7          ,R7 ");
            /* FLOAT (TETA-TETA_INIT) */
       asm("        LDF     R7          ,R6 ");
       asm("        STF     R7  ,@_VECT+116");
       asm("        MPYF    @_VECT+6    ,R7 ");
            /* KTETA*(TETA-TETA_INIT) */
       asm("                ADDF    R7              ,R3 ");
            /*TETA_SOM+KTETA*(TETA-TETA_INIT)*/
       asm("        MPYF    @_VECT+13   ,R6 ");
            /* KTETA*(TETA-TETA_INIT) */
       asm("        ADDF    R3          ,R6 ");
            /* TSOM+TINC -> R2          */
       asm("        ADDF    @_VECT+7    ,R2 ");
            /* TSOM+TINC -> R2          */

/**** TEST SI TERMINE *****/
       asm("        CMPF    @_VECT+8    ,R2 ");
            /* TSOM - TPRED             */
       asm("        BN      NOINIT1        ");

/**** OUI TERMINE *****/
       asm("        LDI     4           ,R4 ");
            /* BIT_MR(2) = 1            */
       asm("        LDF     0           ,R2 ");
            /* 0 -> TSOM                */
```

```
       asm("      ADDF    64        ,R6 ");
            /* ADDIT 90 DEGRE         */
       asm("      LDF     R6        ,R3 ");

   /***** FIN *****/
    asm("NOINIT1 STF     R3  ,@_VECT+117 ");
    asm("        STF     R2  ,@_VECT+118 ");
    asm("        OR      @_VECT+64  ,R4 ");
         /* BIT_MR(2) = 1           */
    asm("        STI     R4  ,@_VECT+64 ");
         /* BIT_MR(2) = 1           */
    asm("        FIX     R6         ,R6 ");
    asm("        ADDI    R6         ,IR0 ");
    asm("        STI     R5  ,@_VECT+113");
    /*** (FIN PARTIE 1 DE INIT. ENCODEUR) ***/ asm("        AND     0FFh       ,IR0 ");
         /* normal. a 8 bits        */
    asm("        STI     IR0 ,@_VECT+87");
         /* store TETA              */ asm("        FLOAT   IR0        ,R7 ");
    asm("        STF     R7  ,@_VECT+79");
    asm("        LDI     @_VECT+58  ,AR7 ");
         /* store ad. DRAM -> AR7   */
    asm("        LDI     *-AR7(2)   ,R7 ");
    asm("        CMPI    11h        ,R7 ");
    asm("        BNE     DTETA          ");
    asm("        CMPI    0h         ,BK ");
    asm("        LDIEQ   1h         ,BK ");
    asm("        LDIEQ   0h         ,RS ");

    asm("DTETA   LDI     0h         ,R0 ");  /* CALCUL dteta */
    asm("        SUBI3   RE,IR0     ,RC ");
```

```
        asm("         LDI    IR0         ,RE ");
        asm("         CMPI   7Fh         ,RC ");
        asm("         LDIP   -100h       ,R0 ");
        asm("         CMPI   -7Fh        ,RC ");
        asm("         LDIN   100h        ,R0 ");
        asm("         ADDI   R0          ,RC ");
        asm("         ADDI   RC          ,RS ");

asm("NDTETA   CMPI   2h          ,R7 ");
        asm("         BEQ    LECT            ");
        asm("         FLOAT  RS          ,R7 ");
        asm("         MPYF   @_VECT+24   ,R7 ");
        asm("         STF    R7      ,@_VECT+65 ");
/******     CALCUL DE LA VITESSE ET ACCEL. *************/
    /* SOMME DELTATETA */
        asm("LECT     LDI    @_VECT+119  ,R1 ");
             /* DTETA -> R1                  */
        asm("         ADDI   RC          ,R1 ");
             /* DTETA1+DTETA0 -> DTETA1 */
        asm("         STI    R1     ,@_VECT+119 ");

/* INCREMENTE N, SI < 10 msec */
        asm("         LDI    @_VECT+111  ,R7 ");
        asm("         ADDI   1           ,R7 ");
        asm("         STI    R7     ,@_VECT+111 ");
        asm("         CMPI   200         ,R7 ");
        asm("         BN     FINVIT          ");
        asm("         LDI    0           ,R7 ");
        asm("         STI    R7     ,@_VECT+111 ");
        asm("         STI    R7     ,@_VECT+119 ");

/* calcul distance */
        asm("         FLOAT  R1          ,R1 ");
             /* float DTETA1             */
        asm("         MPYF   @_VECT+24   ,R1 ");
             /* normal. dist. (rad/sec) */
```

```
     /* calcul (1/temps) */
     asm("        LDF     @_VECT+25   ,R2 ");

/* calcul V */
     asm("        MPYF    R2          ,R1 ");
        /* W1 = dist * 1/temps        */

/* calcul Acc.   */
     asm("        LDF     @_VECT+66   ,R6 ");
        /* W0 -> R6                   */
     asm("        SUBF3   R6,R1       ,R6 ");
        /* W1 - W0 -> (R6)            */
     asm("        MPYF    R2          ,R6 ");
        /* (W1-W0)*1/temps -> (R6)    */
     /* save vit.& acc. */
     asm("        STF     R1     ,@_VECT+66 ");
        /* store R1 -> vitesse        */
     asm("        STF     R6     ,@_VECT+67 ");
        /* store R6 -> accelerat. */ asm("FINVIT  LDI     @_VECT+0    ,R7 ");
     asm("        LSH     -1          ,R7 ");
     asm("        BNC     AS_STD          ");
     asm("        LDF     @_VECT+4    ,R1 ");

/******** ASSERVISSEMENT DE LA VITESSE ****************/
     asm("        LDF     @_VECT+66   ,R6 ");
     asm("        SUBF    R6          ,R1 ");
        /* (Wcons-Wmec) -> R1         */

/* PROPORTIONNEL */
     asm("        LDF     @_VECT+11   ,R2 ");
        /* KP -> R2                   */
     asm("        MPYF    R1          ,R2 ");
        /* KP(Wcons-Wext) -> R3       */
```

```
/* INTEGRE */
asm("          LDF   @_VECT+10   ,R3  ");
    /* ki -> R2                        */
asm("          MPYF  R1          ,R3  ");
    /* ki(Wcons-Wext) -> R2            */
asm("          ADDF  @_VECT+126  ,R3  ");
    /* ki(Wcons-Wext)+SOMME->R2 */

/* BORNE INTEGRAL */
asm("          LDF   @_VECT+53   ,R4  ");
    /* +BORNE_I DANS R4                */
asm("          NEGF  R4          ,R5  ");
    /* -BORNE_I DANS R4                */
asm("          CMPF  R5          ,R3  ");
asm("          LDFN  R5          ,R3  ");
asm("          CMPF  R4          ,R3  ");
asm("          LDFP  R4          ,R3  ");
asm("          STF   R3    ,@_VECT+126 ");
    /* store (int)                     */

/* SOMME INTEGRAL + PROPORTIONNEL */
asm("          ADDF  R3          ,R2  ");
asm("          STF   R2    ,@_VECT+69 ");
asm("          LDF   R2          ,R4  ");
asm("          BR    AS_VIT           ");

/*********     CALCUL DE AMPL    ********************/
asm("AS_STD    LDF   @_VECT+1    ,R4  ");
    /* load Tcons -> R4                */
asm("AS_VIT    ADDF  @_VECT+83   ,R4  ");
    /* R4 + Text -> R4                 */
asm("          ADDF  @_VECT+118  ,R4  ");
    /* R4 + Text -> R4                 */
asm("          MPYF  @_VECT+29   ,R4  ");
    /* R4 x 1/PSI -> R4                */
```

```
      /* PROTECTION DE SURTENSION AVEC HYSTERESIS (103) (104) */
      asm("         LDF    @_VECT+72 ,R7  ");
            /* load Vdc -> R7            */
      asm("         CMPF   @_VECT+105,R7  ");
            /* Vdc - PROT_DC             */
      asm("         LDFP   0          ,R4 ");
            /* SI POSITIF 0 -> R4        */
      asm("         LDFP   @_VECT+104,R0  ");
            /* SI POS. PROT_DCMIN->R0 */
      asm("         LDFN   @_VECT+103,R0  ");
            /* SI NEG. PROT_DCMAX->R0 */
      asm("         STF    R0    ,@_VECT+105");
            /* R0 -> PROT_DC             */

      /* LIMITE LE COURANT A Imax */
      asm("         LDF    @_VECT+17  ,R0 ");
            /* LOAD Imax -> R0           */
      asm("         NEGF   R0         ,R7 ");
            /* LOAD -Imax -> R7          */
      asm("         CMPF   R7         ,R4 ");
            /* R4 - R7                   */
      asm("         LDFN   R7         ,R4 ");
            /* IF R4<R7 => R7->R4        */
      asm("         CMPF   R0         ,R4 ");
            /* R4 - R0                   */
      asm("         LDFP   R0         ,R4 ");
            /* IF R4>R0 => R0-> R7       */

/******   CALCUL DE Iac Ibc ET Icc *********************/
      asm("         LDI    @_VECT+63 ,R0  ");
            /* set position de carte  */
      asm("         STI    R0    ,*++AR0(2)");
            /* store -> PAGEADDR.     */
      asm("         LDF    R4         ,R7 ");
```

```
        asm("          MPYF  @_VECT+18   ,R7  ");
            /* Cphase * AMPL -> R7         */
        asm("          FIX   R7          ,R7  ");
            /* INT(R7) -> R7               */
        asm("          ADDI  R7          ,IR0 ");
            /* TETA + COMP. PHASE          */
        asm("          AND   0FFh        ,IR0 ");

asm("          MPYF3 R4,*+AR3(IR0),R1");
            /* AMPL x sin(IR0) -> R1      */
        asm("          STF   R1     ,@_VECT+91 ");
            /* store IAC                   */ asm("          LDI   170         ,R7  ");
            /* MODIF 26/10/94 */
        asm("          CMPI  85          ,IR0 ");
        asm("          LDIP  171         ,R7  ");
        asm("          ADDI  R7          ,IR0 ");
            /*PHA + TETA +4*pi/3 ->IR0*/
        asm("          AND   0FFh        ,IR0 ");
            /* tronquer sur 8 bits        */
        asm("          MPYF3 R4,*+AR3(IR0),R3");
            /* AMPL x sin(IR0) -> R3      */
        asm("          STF   R3     ,@_VECT+93");
            /* store ICC                   */ asm("          ADDF3 R1,R3       ,R2  ");
            /* IAC + IBC -> R2             */
        asm("          NEGF  R2          ,R2  ");
            /* -1 * (IAC + IBC) -> R2 */
        asm("          STF   R2     ,@_VECT+92");
            /* store IBC                   */
    /******   ACQUISITION DE Iabc ET NORMALISATION **/
        asm("          LDI   *+AR1(3)    ,R4  ");
```

```
        asm("        ASH    -20         ,R4 ");
            /* normal. a 12 bits signe*/
        asm("        FLOAT  R4          ,R4 ");
            /* convertie float          */
        asm("        LDF    @_VECT+23   ,R7 ");
            /* NO_Iabce -> R7           */
        asm("        MPYF   R7          ,R4 ");
            /* normalise valeur de Ia */
        asm("        ADDF   @_VECT+134  ,R4 ");
            /* additionne OFS_IA        */
        asm("        STF    R4    ,@_VECT+84");
            /* store IA                 */ asm("        LDI    *+AR1(3)    ,R5 ");
        asm("        ASH    -20         ,R5 ");
            /* normal. a 12 bits signe*/
        asm("        FLOAT  R5          ,R5 ");
            /* convertie float          */
        asm("        MPYF   R7          ,R5 ");
            /* normalise valeur de Ib */
        asm("        ADDF   @_VECT+135  ,R5 ");
            /* additionne OFS_IB        */
        asm("        STF    R5    ,@_VECT+85");
            /* store IB                 */
        asm("        LDI    *+AR1(3)    ,R6 ");
        asm("        ASH    -20         ,R6 ");
            /* normal. a 12 bits signe*/
        asm("        FLOAT  R6          ,R6 ");
            /*convertie float           */
        asm("        MPYF   R7          ,R6 ");
            /*normalise valeur de Ic */
        asm("        ADDF   @_VECT+136  ,R6 ");
            /* additionne OFS_IC        */
        asm("        STF    R6    ,@_VECT+86");
            /*store IC                  */
```

```
/******      INITIALISATION CALCUL OFFSET    ********/
    asm("       LDI    @_VECT+124 ,R0 ");
         /* INCREMENT DE SOMME      */
    asm("       CMPI   1000       ,R0 ");
         /* INCREMENT - 1000       */
    asm("       BLE    INITSEN       ");
         /* SI <= 1000 (INITSEN)   */

/* VERIFIE S'IL Y A EU DEMANDE DE CALIBRATION DE SENSEUR */
    asm("       LDI    @_VECT+0   ,R7 ");
    asm("       LSH    -2         ,R7 ");
         /* COMPARE AVEC BIT1      */
    asm("       BNC    OFSEND        ");
         /* PAS INIT. -> OFSEND    */
    asm("       LDI    0          ,R0 ");
    asm("       STI    R0 ,@_VECT+124 ");
    asm("       LDF    0          ,R0 ");
    asm("       STF    R0 ,@_VECT+121 ");
         /* RESET SOM_OFSIA        */
    asm("       STF    R0 ,@_VECT+122 ");
         /* RESET SOM_OFSIB        */
    asm("       STF    R0 ,@_VECT+123 ");
         /* RESET SOM_OFSIC        */
    asm("       STF    R0 ,@_VECT+134 ");
         /* RESET OFS_IA           */
    asm("       STF    R0 ,@_VECT+135 ");
         /* RESET OFS_IB           */
    asm("       STF    R0 ,@_VECT+136 ");
         /* RESET OFS_IC           */
    asm("       BR     OFSEND        ");

/* FAIRE UNE SOMME SUR 1000 UNITES DE Ia,Ib,Ic *****/
    asm("INITSEN LDI   121        ,IR1");
    asm("       ADDF3  *+AR4(IR1),R4,R7");
         /*IA(0) = IA(-1) + IA(0) */
    asm("       STF    R7 ,*+AR4(IR1) ");
```

```
        asm("          ADDI   1             ,IR1");
        asm("          ADDF3  *+AR4(IR1),R5,R7");
            /*IB(0) = IB(-1) + IB(0) */
        asm("          STF    R7 ,*+AR4(IR1) ");
        asm("          ADDI   1             ,IR1");
        asm("          ADDF3  *+AR4(IR1),R6,R7");
            /*IC(0) = IC(-1) + IC(0) */
        asm("          STF    R7 ,*+AR4(IR1) ");
        asm("          CMPI   1000          ,R0 ");
        /* somme sur 1000 unite */
        asm("          BNED   OFSEND        ");
        asm("          ADDI   1             ,R0 ");
        asm("          STI    R0 ,@_VECT+124 ");
        asm("          LDF    @_VECT+15  ,R0 ");
        /* NORMALISE LORSQUE 1000 ADDITION EST ATTEIND *****/
        asm("          MPYF3  *+AR4(IR1),R0,R7");
            /*  IC = SIC *-0.001  */
        asm("          STF    R7 ,@_VECT+136 ");
        asm("          SUBI   1             ,IR1");
        asm("          MPYF3  *+AR4(IR1),R0,R7");
            /*  IB = SIB *-0.001  */
        asm("          STF    R7 ,@_VECT+135 ");
        asm("          SUBI   1             ,IR1");
        asm("          MPYF3  *+AR4(IR1),R0,R7");
            /*  IA = SIA *-0.001  */
        asm("          STF    R7 ,@_VECT+134 ");

/* SET BIT 1 POUR CONFIRMER LA NORMALISATION TERMINEE *****/
        asm("          LDI    2             ,R7 ");
        asm("          OR     @_VECT+64     ,R7 ");
        asm("          STI    R7  ,@_VECT+64");
        /********       ORGANE DE REGULATION           **********/

        /***** calcul d'erreur sur la consigne *****/
        asm("OFSEND    SUBF3  R4,R1         ,R1  ");
```

```
              /* IAC - IA -> ERA        */
      asm("        SUBF3 R5,R2       ,R2   ");
              /* IBC - IB -> ERB        */
      asm("        SUBF3 R6,R3       ,R3   ");
              /* ICC - IC -> ERC        */

/***** calcul du proportionnel        *****/
      asm("        LDF  @_VECT+12    ,R7   ");
              /* load Kp dans R7        */
      asm("        MPYF3 R1,R7       ,R4   ");
              /* Kp * (IAC - IA) -> R4  */
      asm("        MPYF3 R2,R7       ,R5   ");
              /* Kp * (IBC - IB) -> R5  */
      asm("        MPYF3 R3,R7       ,R6   ");
              /* Kp * (ICC - IC) -> R6  */

/*** calcul de l'integral ***/ asm("        LDF   @_VECT+16 ,R7   ");
              /* load KI1 dans R7       */
      asm("        MPYF  R7          ,R1  ");
              /* KI1*ERA -> R1          */
      asm("        ADDF  @_VECT+137,R1   ");
              /* R7 + ERAEI1->R1        */
      asm("        MPYF  R7          ,R2  ");
              /* KI1*ERB -> R2          */
      asm("        ADDF  @_VECT+138,R2   ");
              /* R7 + ERBEI1->R2        */
      asm("        MPYF  R7          ,R3  ");
              /* KI1*ERC -> R3          */
      asm("        ADDF  @_VECT+139,R3   ");
              /* R7 + ERCEI1->R3        */

/***** borne l'integral *****/
      asm("        LDF   @_VECT+22 ,R0   ");
      asm("        NEGF  R0          ,R7  ");
```

```
     asm("          CMPF  R7         ,R1   ");
     asm("          LDFN  R7         ,R1   ");
          /* si negatif  -XVdc ->VAC */
     asm("          CMPF  R0         ,R1   ");
          /* SOMA - (XVdc)           */
     asm("          LDFP  R0         ,R1   ");
          /* si negatif   XVdc ->VAC */
     asm("          CMPF  R7         ,R2   ");
          /* SOMB - (-XVdc)          */
     asm("          LDFN  R7         ,R2   ");
          /* si negatif  -XVdc ->VBC */
     asm("          CMPF  R0         ,R2   ");
          /* SOMB - (XVdc)           */
     asm("          LDFP  R0         ,R2   ");
          /* si negatif   XVdc ->VBC */
     asm("          CMPF  R7         ,R3   ");
          /* SOMC - (-XVdc)          */
     asm("          LDFN  R7         ,R3   ");
          /* si negatif  -XVdc ->VCC */
     asm("          CMPF  R0         ,R3   ");
          /* SOMC - (XVdc)           */
     asm("          LDFP  R0         ,R3   ");
          /* si negatif   XVdc ->VCC */

     /* faire la somme des trois integral et divise par 3 *****/
     asm("          ADDF3 R1,R2      ,R7   ");
     asm("          ADDF  R3         ,R7   ");
     asm("          MPYF  @_VECT+57  ,R7   ");
     asm("                SUBF  R7                 ,R1   ");
     /*Int.a-(Int.a+Int.b+Int.c)/3->R1*/
     asm("          STF   R1   ,@_VECT+137");
          /* store ERAEI -> ERAEI1 */
     asm("          ADDF  R1         ,R4   ");
          /* prop.+derive+integr->R4*/
     asm("                SUBF  R7                 ,R2   ");
     /*Int.b-(Int.a+Int.b+Int.c)/3->R2*/
```

```
    asm("        STF    R2   ,@_VECT+138");
       /* store ERBEI -> ERBEI1  */
    asm("        ADDF   R2         ,R5  ");
       /* prop.+derive+integr->R5*/
    asm("              SUBF    R7             ,R3   ");
    /*Int.c-(Int.a+Int.b+Int.c)/3->R3*/
    asm("        STF    R3   ,@_VECT+139");
       /* store ERCEI -> ERCEI1  */
    asm("        ADDF   R3         ,R6  ");
       /* prop.+derive+integr->R6*/

/*   c a l c u l   d e   l a    t e n s i o n    F E M
    selonWmec*sin(TETA+AV_PHASE*Wmec)*/
       /***** phase B *****/
    asm("        LDF    @_VECT+28 ,R0  ");
       /* load AV_PHASE -> R0    */
    asm("        MPYF   @_VECT+66 ,R0  ");
       /* AV_PHASE x Wmec -> R0  */
    asm("        FIX    R0         ,R0  ");
       /* conver. signed int R0  */
    asm("        ADDI   256        ,R0  ");
       /* conver. int 8 bits R0  */
    asm("        ADDI   R0             ,IR0  ");
    /*AV_PHASE*Wmec+TETA*4*pi/3->IR0*/
    asm("        AND    0FFh       ,IR0 ");
       /* tronquer sur 8 bits    */
    asm("        LDF    @_VECT+66 ,R2  ");
       /* load Wmec dans R2      */
    asm("        MPYF3  R2,*+AR3(IR0),R3");
       /* Wmec x sin(IR0) -> R3  */
    asm("        MPYF   @_VECT+27 ,R3  ");
       /* R3 x PSI -> R3         */
    asm("        STF    R3   ,@_VECT+89 ");
       /* store EB */
    asm("        ADDF   R3         ,R5  ");
       /* prop.+der.+inte.+EB->R5*/
```

```
        asm("        LDI    85        ,R0 ");
            /* PATCH ENCODEUR 26/10/94*/
        asm("        CMPI   170       ,IR0 ");
        asm("        LDIP   86        ,R0 ");
        asm("        ADDI   R0        ,IR0 ");
        /* AV_PHASE*Wmec+TETA->IR0*/ asm("        AND    0FFh      ,IR0 ");
            /* tronquer sur 8 bits    */
        asm("        MPYF3  R2,*+AR3(IR0),R7");
            /* W x sin(IR0) -> R7      */
        asm("        MPYF   @_VECT+27 ,R7 ");
            /* R7 x PSI -> R7          */
        asm("        STF    R7    ,@_VECT+90 ");
            /* store EC */
        asm("        ADDF   R7        ,R6 ");
            /* prop.+der.+inte.+EC->R6*/ asm("        ADDF   R3        ,R7 ");
            /* EB + EC -> R7           */
        asm("        NEGF   R7        ,R7 ");
            /* -1 * (EB + EC) -> R7    */
        asm("        STF    R7   ,@_VECT+88 ");
            /* store EA */
        asm("        ADDF   R7        ,R4 ");
            /* prop.+der.+inte.+EA->R4*/

/******    ACQUISITION DE Vdc ET NORMALISATION   **********/

        asm("        LDI    *+AR1(3)  ,R0 ");
        asm("        ASH    -20       ,R0 ");
            /* normal. a 12 bits signe*/
        asm("        ABSI   R0        ,R0 ");
            /* valeur absolue de VDC */
        asm("        CMPI   102       ,R0 ");
            /* Vdc - 5%xVdc             */
```

```
        asm("         LDIN 102          ,R0  ");
            /* si < 5% de Vdc->5%xVdc */
        asm("         FLOAT R0           ,R0  ");
            /* convertie float         */
        asm("         MPYF  @_VECT+26   ,R0  ");
            /* normalise valeur de Vdc*/
        asm("         STF   R0          ,@_VECT+72");
            /* store Vdc               */

     /* DIVISION  (1/Vdc) */
        asm("         PUSHF             R0   ");
            /* pushf VDC (float)       */
        asm("         POP               R3   ");
            /* pop   VDC (integer)->R7*/
        asm("         ASH   -24         ,R3  ");
            /* chercher exposant -> R7*/
        asm("         NEGI              R3   ");
            /* exposant = -exposant    */
        asm("         SUBI  1           ,R3  ");
            /* exposant = exposant - 1*/
        asm("         ASH   24          ,R3  ");
            /* retourne exposant -> R7*/
        asm("         PUSH              R3   ");
            /* pushf VDC (float)       */
        asm("         POPF              R3   ");
            /* pop   VDC (integer)->R7*/
    /* 1 ITERATION */
        asm("         MPYF3     R3,R0,R2  ");
            /* R2 = VDC * X[0]         */
        asm("         SUBRF 2.0         ,R2  ");
            /* R2 = 2.0 -VDC * X[0]    */
        asm("         MPYF  R2          ,R3  ");
            /* R3 = X[0] * R2          */
    /* 2 ITERATION */
        asm("         MPYF3     R3,R0,R2  ");
            /* R2 = VDC * X[0]         */
```

```
        asm("      SUBRF  2.0        ,R2  ");
            /* R2 = 2.0 -VDC * X[1]    */
        asm("      MPYF   R2         ,R3  ");
            /* R3 = X[1] * R2          */
 /* 3 ITERATION */
        asm("      MPYF3  R3,R0,R2   ");
            /* R2 = VDC * X[0]         */
        asm("      SUBRF  2.0        ,R2  ");
            /* R2 = 2.0 -VDC * X[2]    */
        asm("      MPYF   R2         ,R3  ");
            /* R3 = X[2] * R2          */
 /* 4 ITERATION */
        asm("      MPYF3  R3,R0,R2   ");
            /* R2 = VDC * X[0]         */
        asm("      SUBRF  2.0        ,R2  ");
            /* R2 = 2.0 -VDC * X[3]    */
        asm("      MPYF   R2         ,R3  ");
            /* R3 = X[3] * R2          */
 /* 5 ITERATION */
        asm("      RND               R3  ");
            /* MINIMISER L'ERREUR      */
        asm("      MPYF3  R3,R0,R2   ");
            /* R2 = VDC * X[4]         */
        asm("      SUBRF  1.0        ,R2  ");
            /* R2 = 1.0 -VDC * X[4]    */
        asm("      MPYF   R3         ,R2  ");
            /* R2 = X[4] * R2          */
        asm("      ADDF   R2         ,R3  ");
            /* R3 = X[4] + R2          */
        asm("      RND    R3         ,R3  ");
            /* R3 = X[4] + R2          */
        asm("      STF    R3         ,@_VECT+125");
            /* store 1/VDC             */

/*   ACQUISITION DE COUPLE ET NORMALISATION   ***********/
```

```
        asm("      LDI    *+AR1(3)      ,R2 ");
        asm("      ASH    -20           ,R2 ");
        asm("      FLOAT  R2            ,R2 ");
        asm("      MPYF   @_VECT+30     ,R2 ");
        asm("      STF    R2            ,@_VECT+83");
        asm("      LDI    *+AR1(3)      ,R2 ");   /* 9/11/94 */
        asm("      ASH    -20           ,R2 ");
        asm("      FLOAT  R2            ,R2 ");
        asm("      MPYF   @_VECT+30     ,R2 ");
        asm("      STF    R2            ,@_VECT+80");

asm("      LDI    *+AR1(3)      ,R2 ");   /* 9/11/94 */
        asm("      ASH    -20           ,R2 ");
        asm("      FLOAT  R2            ,R2 ");
        asm("      MPYF   @_VECT+30     ,R2 ");
        asm("      STF    R2            ,@_VECT+81");

/********   CALCUL DE VAC        ****************/

        asm("      MPYF   @_VECT+19     ,R0 ");
            /* XVdc x Vdc -> R0           */
        asm("      NEGF   R0            ,R1 ");
            /* -XVdc x Vdc -> R1          */

        /***** BORNE VAC *****/
        asm("      CMPF   R1            ,R4 ");
            /* SOMA - (-XVdc)             */
        asm("      LDFN   R1            ,R4 ");
            /* si negatif -XVdc ->VAC */
        asm("      CMPF   R0            ,R4 ");
            /* SOMA - (XVdc)              */
        asm("      LDFP   R0            ,R4 ");
            /* si negatif  XVdc ->VAC */
        asm("      STF    R4            ,@_VECT+97 ");
            /* store VAC                 */
```

```
/***** BORNE VBC *****/
       asm("         CMPF   R1          ,R5  ");
           /* SOMB - (-XVdc)              */
       asm("         LDFN   R1          ,R5  ");
           /* si negatif -XVdc ->VBC     */
       asm("         CMPF   R0          ,R5  ");
           /* SOMB - (XVdc)               */
       asm("         LDFP   R0          ,R5  ");
           /* si negatif  XVdc ->VBC     */
       asm("         STF    R5   ,@_VECT+98 ");
           /* store VBC                   */

/***** BORNE VCC *****/
       asm("         CMPF   R1          ,R6  ");
           /* SOMC - (-XVdc)              */
       asm("         LDFN   R1          ,R6  ");
           /* si negatif -XVdc ->VCC     */
       asm("         CMPF   R0          ,R6  ");
           /* SOMC - (XVdc)               */
       asm("         LDFP   R0          ,R6  ");
           /* si negatif  XVdc ->VCC     */
       asm("         STF    R6   ,@_VECT+99 ");
           /* store VCC                   */
       /* convertir pour FPGA */
       asm("NOENERG  LDF    @_VECT+125,R3  ");
           /* 1/Vdc -> R3                 */
       asm("         MPYF   @_VECT+20 ,R3  ");
           /* KOUT1 x 1/Vdc -> R3         */
       asm("         MPYF   R3          ,R4  ");
           /* R4 = 1/Vdc * 256 *VAC      */
       asm("         MPYF   R3          ,R5  ");
           /* R5 = 1/Vdc * 256 *VBC      */
       asm("         MPYF   R3          ,R6  ");
           /* R6 = 1/Vdc * 256 *VCC      */
       asm("         LDF    @_VECT+21 ,R1  ");
           /* KOUT2 -> R1                 */
```

```
     asm("          ADDF   R1             ,R4   ");
           /* IMVA = R4 + 255.5           */
     asm("          STF    R4  ,@_VECT+100 ");
           /* store IMVA                  */
     asm("          FIX    R4             ,R4   ");
           /* convertie R4 en integer*/
     asm("          ADDF   R1             ,R5   ");
           /* IMVB = R5 + 255.5           */
     asm("          STF    R5  ,@_VECT+101 ");
           /* store IMVB                  */
     asm("          FIX    R5             ,R5   ");
           /* convertie R5 en integer*/
     asm("          ADDF   R1             ,R6   ");
           /* IMVC = R6 + 255.5           */
     asm("          STF    R6  ,@_VECT+102 ");
           /* store IMVC                  */
     asm("          FIX    R6             ,R6   ");
           /* convertie R6 en integer*/

     asm("          LDI    255            ,R7   ");
     asm("          LSH    9              ,R7   ");
     asm("          OR     R7             ,R6   ");
     /* out FPGA */
     asm("          LSH    9              ,R6   ");
           /* shift IMVC de 9             */
     asm("          OR     R5             ,R6   ");
           /* IMVC,IMVB -> R6             */
     asm("          LSH    9              ,R6   ");
           /* shift IMVC,IMVB de 9        */
     asm("          OR     R4             ,R6   ");
           /* IMVC,IMVB,IMVA -> R6        */
     asm("          LDI    @_VECT+62 ,R1  ");
           /* set position de carte       */
     asm("          STI    R1       ,*+AR0(2)");
           /* store -> PAGEADDR.          */
     asm("          STI    R6       ,*+AR1(3)");
```

```
                /* out FPGA             */
      /***    TRANSFERT VECTEUR FONTION VEHICULE AU C30   *******/
      /* prepare transfert vecteur vers c30 */
      asm("       LDI @_VECT+58    ,AR7 ");
           /* store ad.DRAMIN -> AR7 */
      asm("       LDI  0           ,R7  ");
      asm("       STI R7           ,*+AR2(0)");
      asm("       STI AR7          ,*+AR2(4)");
           /*store dans src.->AR2(4) */
      asm("       STI AR4          ,*+AR2(6)");
           /*store dans dest.->AR2(6)*/
      asm("       LDI 33           ,R7  ");          /* 33 */
      asm("       STI R7           ,*+AR2(8)");
      asm("       LDI 0C53h        ,R7  ");
      /* verifi si j'ai le droit de lire */
      asm("       LDI 0fh          ,R1  ");
      asm("       CMPI *-AR7(1)    ,R1  ");
           /* 0fh - mem(20 0001)      */
      asm("       BN  NDMAIN            ");
      /* lance le transfert si < 10 */
      asm("       STI R7           ,*+AR2(0)");

/* watch dog laisse une trace */
      asm("       LDI 3h           ,R7  ");
      asm("       STI R7           ,*-AR7(1) ");

/******** TRANSFERT VECTEUR DANS DRAM     ****************/

      asm("       LDI  0           , IR0 ");
      asm("       LDI  @_VECT1     , AR0 ");
      asm("       LDI  @_VECT+58   , AR1 ");
      asm("BOUCLE: CMPI 40         , IR0 ");
      asm("       BLTD BOUCLE           ");
      asm("       LDF  *+AR0(IR0), R0   ");
      asm("       STF  R0 ,*+AR1(IR0)   ");
```

```
     asm("       ADDI  1           , IR0 ");
     asm("       LDI   @_VECT+58   ,AR7 ");
           /* store ad. DRAM -> AR7  */
     asm("       LDI   0h          ,R0  ");
     asm("       STI   R0          ,*-AR7(2) ");
     asm("       STI   R0          ,*-AR7(1) ");
     asm("       LDI   @_VECT+59   ,AR7 ");
           /* store ad. OSCIL.->AR7  */
     asm("       STI   R0          ,*-AR7(1) ");
     asm("       LDI   86          ,R0  ");
     asm("       STI   R0          ,*-AR7(3) ");
     asm("       STI   R0          ,*-AR7(4) ");
     asm("       STI   R0          ,*-AR7(5) ");
     asm("       STI   R0          ,*-AR7(6) ");
     /****** SET L'ADRESSE DES POINTEURS     **************/ asm("       LDI   @_CONTMIX   ,AR0 ");
           /* control mix bus ->AR0  */
     asm("       LDI   @_CONTACQ   ,AR1 ");
           /* control acquit. ->AR1  */
     asm("       LDI   @_CONTDMA   ,AR2 ");
           /* control DMA     ->AR2  */
     asm("       LDI   @_SINUS     ,AR3 ");
           /* adr. vect.SINUS ->AR3  */
     asm("       LDI   @_VECT1     ,AR4 ");
           /* adresse sramin  ->AR4  */
     asm("       LDI   @_CONTIM1   ,AR5 ");
           /* control timer #1->AR5  */
     /****** INIT. CARTE D'ACQUISITION       **************/ asm("       LDI   @_VECT+61   , R0 ");
           /*select module 0, A27=0  */
     asm("       STI   R0          ,*+AR0(2) ");
     asm("       LDI   80h         , R0 ");
           /* inverse polarite entree*/
```

```
        asm("        STI  R0     ,*+AR1(1) ");
        asm("        LDI  0h     , R1 ");
            /*reset FIFO                 */
        asm("        STI  R1     ,*+AR1(0) ");
        asm("        NOP                   ");
        asm("        NOP                   ");
        asm("        LDI  10h    , R0 ");
            /*initial. channel ram    */
        asm("        STI  R0     ,*+AR1(0) ");
        asm("        STI  R1     ,*+AR1(3) ");
            /* set channel #1          */
        asm("        LDI  021h   , R0 ");
            /* set channel #2          */
        asm("        STI  R0     ,*+AR1(3) ");
        asm("        LDI  022h   , R0 ");
            /* set channel #3          */
        asm("        STI  R0     ,*+AR1(3) ");
        asm("        LDI  03h    , R0 ");
            /* set channel #4          */
        asm("        STI  R0     ,*+AR1(3) ");
        asm("        LDI  30h    , R0 ");
            /* set channel #17 LDI 0B0H */
        asm("        STI  R0     ,*+AR1(3) ");
        asm("        LDI  11h    , R0 ");/* 9/11/94 */
        asm("        STI  R0     ,*+AR1(3) ");
        asm("        LDI  92h    , R0 ");/* 9/11/94 */
        asm("        STI  R0     ,*+AR1(3) ");
        asm("        NOP                   ");
        asm("        NOP                   ");
        asm("        LDI  0      ,IR1 ");
    /******* DEPART DU SYSTEME INTERRUPT    ****************/
        asm("        STI  R1     ,*AR0 ");
            /* reset intmix 02         */
        asm("        LDI  0Eh    , R0 ");
            /* enable intmix 02        */
        asm("        STI  R0     ,*AR0 ");
```

```
    asm("          LDI  5h         , IE  ");
       /* enable int02 ET int00   */
    asm("          STI  R1         ,*AR1 ");
       /*reset FIFO carte acqui. */
    asm("          LDI  0F4h       , R0  ");
       /* start acqui             */
    asm("          STI  R0         ,*AR1 ");
    asm("          LDI  @_VECT+62  , R1  ");
       /* select module 2, A27=1 */
    asm("          STI  R1         ,*+AR0(2) ");
    asm("          OR   2000h      , ST  ");
       /* set GIE enable          */
    asm("          LDI  255        , R7  ");
    asm("          LSH  27         , R7  ");
    asm("          LDI  @_VECT+62  ,R1   ");
    asm("          STI  R1   ,*+AR0(2)   ");
    asm("          STI  R7   ,*+AR1(3)   ");
```

103

Although the present invention has been described hereinabove by way of preferred embodiments thereof it should be pointed out that any modification to these preferred embodiments, within the scope of the appended claims, are not deemed to change or alter the nature and scope of the present invention.

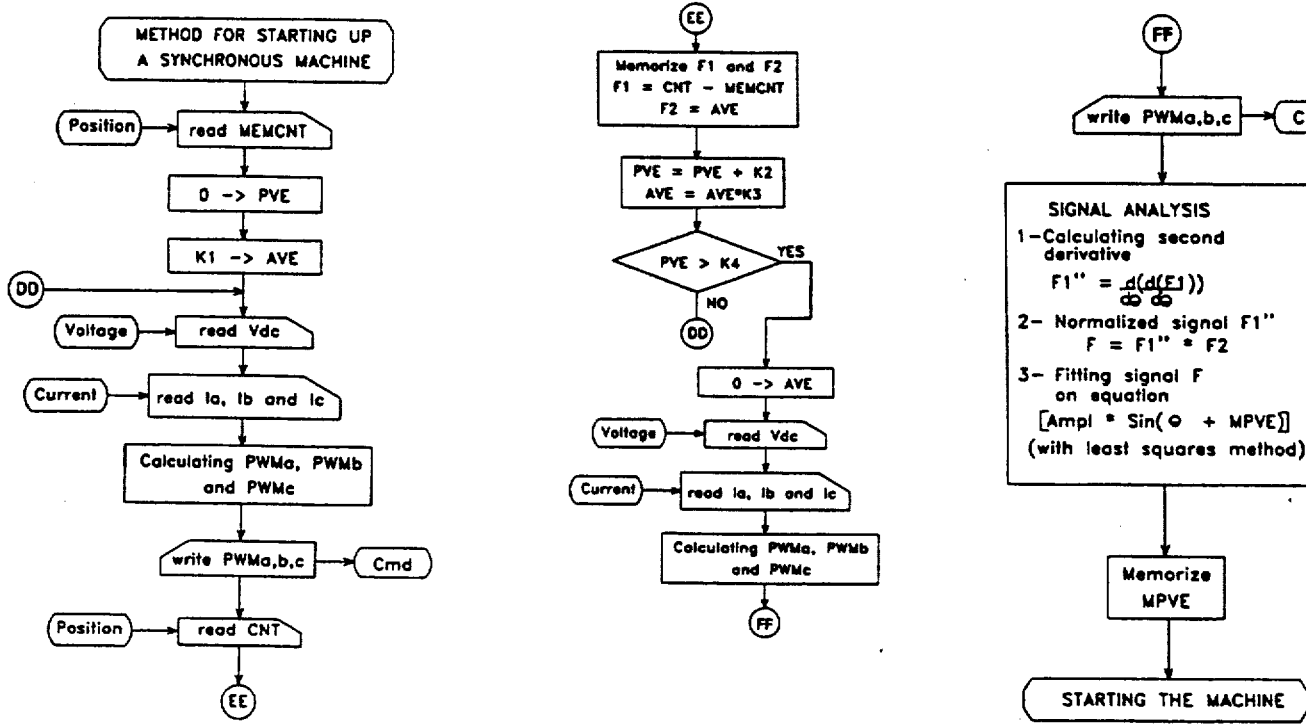

What is claimed is:

1. Method for starting up a synchronous machine having a rotor and a stator provided with a winding, said rotor having an initial position with respect to said stator, said method comprising the steps of:
   (a) initializing a starting phase of a first vectorial sum of successive vectorial sums of currents to be applied to said winding;
   (b) applying successive vectorial sums of currents to said winding, each of said successive vectorial sums having a phase;
   (c) detecting, for each of said vectorial sums of currents applied in said step (b), a movement of said rotor and a direction thereof with respect to said stator;
   (d) compensating, for each of said movement and direction detected in said step (c), the phase PVE of a subsequent vectorial sum of said successive vectorial sums of currents applied to said winding to bring back said rotor towards said initial position;
   (e) detecting whether said rotor has moved with respect to said stator after applying of said successive vectorial sums of currents and either increasing said starting phase by a value different from a multiple of 180 electrical degrees if said rotor has not moved with respect to said stator and returning to said step (b), or going to a step (f);
   (f) after said step (e), storing the phase value of the last of said successive vectorial sums applied to said winding, whereby said machine is now ready to operate from said phase value stored in said step (f).

2. Method according to claim 1, wherein, in said step (d), the phase PVE is calculated by means of the following equations:

$$INT=K*MOV+INT1$$

$$PVE=INT+CNT$$

where INT1 is a precedent calculated integrated error, INT is a current calculated integrated error, MOV is said movement and said direction thereof detected in said step (c) with respect to said initial position, CNT is representative of a position of said rotor and K is a predetermined constant.

3. Method according to claim 1, wherein, in said step (d), the phase PVE is calculated by means of the following equations:

$$INT=K*MOV+INT1$$

$$PVE=Kp*MOV+INT+CNT$$

where INT1 is a precedent calculated integrated error, INT is a current calculated integrated error, MOV is said movement and said direction thereof detected in said step (c) with respect to said initial position, CNT is representative of a position of said rotor, K and Kp are predetermined constants.

4. Method according to claim 1, wherein said step (b) comprises the steps of:
   (i) determining, for each of said successive vectorial sums of currents applied to said winding, an increased amplitude value of a subsequent vectorial sum of said successive vectorial sums of currents to be applied to said winding; and
   (ii) determining whether the increased amplitude value of said subsequent vectorial sum has reached a predetermined amplitude value, and either terminating said applying of successive sums of currents of said step (b) and going to said step (e) if the increased amplitude value of said subsequent vectorial sum has reached said predetermined amplitude value, or continuing said applying of successive vectorial sums of said step (b).

5. Method according to claim 4, wherein said first vectorial sum of successive vectorial sums of currents has an amplitude of zero value, and a phase of zero value.

6. Method according to claim 4, wherein said increased amplitude value is determined from the following equation:

$$AV=AVE+I,$$

where AV is said increased amplitude value, AVE is an amplitude value of a precedent sum of said successive vectorial sums of currents applied to said winding, and I is a constant value.

7. Method according to claim 1, wherein, in said step (b), each of said successive vectorial sums of currents is applied to said winding by means of pulse-width modulated signals.

8. Method according to claim 1, wherein, in said step (e), said starting phase is increased by a value of 90 electrical degrees.

9. Method of starting up a synchronous machine having a rotor and a stator provided with a winding, comprising the steps of:
   (a) applying a predetermined sequence of vectorial sums of currents to said winding, said sequence of vectorial sums having predetermined variable phases;
   (b) detecting and storing, for each of said vectorial sums of currents applied in said step (a), a movement of said rotor and a direction thereof with respect to said stator;
   (c) establishing a function F1 with respect to phase, based on said movements and directions thereof, and establishing a function F2 with respect to phase, based on amplitudes of said sequence of vectorial sums;
   (d) mathematically fitting an equation F resulting from said functions F1 and F2 with a predetermined equation to obtain a phase difference, whereby said machine is ready to operate from said phase difference.

10. Method according to claim 9, wherein, in said step (a), said predetermined sequence of vectorial sums of currents applied to said winding has predetermined variable phases which vary from a first predetermined phase value to a second predetermined phase value.

11. Method according to claim 10, wherein, in said step (a), said first predetermined phase value is zero.

12. Method according to claim 9, wherein said step (d) comprises the steps of:
   (i) calculating second derivative F1" of said function F1; and
   (ii) normalizing said function F1" by means of said function F2 to obtain said equation F resulting from said functions F1 and F2.

13. Method according to claim 9, wherein, in said step (a), each vectorial sum of said sequence of vectorial sums of currents is applied to said winding by means of pulse-width modulated signals.

14. Method according to claim 9, wherein said fitting of step (d) is done by means of an at least square method; and said predetermined equation is defining a sinus which is AMPL*Sin(θ+said phase difference) where AMPL is a given amplitude, and θ is representative of said variable phases.

15. Apparatus for starting up a synchronous machine having a rotor and a stator provided with a winding, said rotor having an initial position with respect to said stator, said apparatus comprising:

means for initializing a starting phase of a first vectorial sum of successive vectorial sums of currents to be applied to said winding;

means for applying successive vectorial sums of currents to said winding, each of said successive vectorial sums having a phase;

means for detecting, for each of said applied vectorial sums of currents, a movement of said rotor and a direction thereof with respect to said stator;

means for compensating, for each of said movement and direction thereof which have been detected, the phase of a subsequent vectorial sum of said successive vectorial sums of currents applied to said winding to bring back said rotor towards said initial position;

means for increasing said starting phase by a value different from a multiple of 180 electrical degrees if said rotor, after applying of said successive vectorial sums of currents, has not moved with respect to said stator; and means for storing the phase value of the last of said successive vectorial sums applied to said rotor, whereby said machine is ready to operate from said phase value stored in said means for storing.

16. Apparatus according to claim 15, wherein said means for detecting said movement of said rotor and said direction thereof with respect to said stator comprise an up/down counter and an incremental encoder having an input connected to said rotor and an output connected to an input of said up/down counter.

17. Apparatus according to claim 16, wherein:

said incremental encoder has a second output for generating an index signal; and said up/down counter has a loading input for receiving said index signal, whereby said index signal is used as a loading signal to confirm the absolute position the rotor with respect to the stator when the synchronous machine is running.

18. Apparatus according to claim 15, wherein said means for initializing, said means for increasing, said means for storing and said means for compensating are all parts of a control unit provided with an operating software.

19. Apparatus according to claim 15, wherein said means for applying comprise:

a control unit provided with an operating software;

a current detector having inputs for detecting said currents applied to said winding and a digital output connected to an input of said control unit;

an inverter having outputs for applying said successive vectorial sums of currents to said winding, and an input for receiving commanding signals from said control unit; and a voltage detector having an input for detecting a power supply voltage applied to said inverter and a digital output connected to an input of said control unit.

20. Apparatus for starting up a synchronous machine having a rotor and a stator provided with a winding, comprising:

means for applying a predetermined sequence of vectorial sums of currents to said winding, said sequence of vectorial sums having predetermined variable phases;

means for detecting and storing, for each of said applied vectorial sums of currents, a movement of said rotor and a direction thereof with respect to said stator;

means for establishing a function F1 with respect to phase, based on said movements and directions thereof;

means for establishing a function F2 with respect to phase, based on amplitudes of said sequence of vectorial sums; and means for mathematically fitting an equation F resulting from said functions F1 and F2 with a predetermined equation to obtain a phase difference, whereby said machine is ready to operate from said phase difference.

21. Apparatus according to claim 20, wherein said means for detecting and storing said movement of said rotor and said direction thereof with respect to said stator comprise a control unit provided with an operating software, an up/down counter having an output connected to said control unit, and an incremental encoder having an input connected to said rotor and an output connected to an input of said up/down counter.

22. Apparatus according to claim 21, wherein:

said incremental encoder has a second output for generating an index signal; and said up/down counter has a loading input for receiving said index signal, whereby said index signal is used as a loading signal to confirm the absolute position the rotor with respect to the stator when the synchronous machine is running.

23. Apparatus according to claim 20, wherein said means for establishing said function F1, said means for establishing said function F2 and said means for mathematically fitting said equation F resulting from said functions F1 and F2 are all parts of a control unit provided with an operating software.

24. Apparatus according to claim 20, wherein said means for applying comprise:

a control unit provided with an operating software;

a current detector having inputs for detecting said currents applied to said winding and a digital output connected to an input of said control unit;

an inverter having outputs for applying said predetermined sequence of vectorial sums of currents to said winding, and an input for receiving command signals from said control unit; and a voltage detector having inputs for detecting a power supply voltage applied to said inverter and a digital output connected to an input of said control unit.

* * * * *

UNITED STATES PATENT AND TRADEMARK OFFICE
CERTIFICATE OF CORRECTION

Page 1 of 4

PATENT NO. : 5,537,020
DATED : July 16, 1996
INVENTOR(S) : Pierre Couture, et al.

It is certified that error appears in the above-indentified patent and that said Letters Patent is hereby corrected as shown below:

The title page, showing an illustrative figures, should be deleted and substitute therefor the attached title page.

Delete Drawing Sheets 4B and 4C, and substitute therefor the Drawing Sheets, consisting of FIGS. 4B and 4C, as shown on the attached pages.

Signed and Sealed this

Eleventh Day of February, 1997

Attest:

BRUCE LEHMAN

*Attesting Officer*    *Commissioner of Patents and Trademarks*

United States Patent [19]

Couture et al.

[11] Patent Number: 5,537,020
[45] Date of Patent: Jul. 16, 1996

[54] METHOD AND APPARATUS FOR STARTING UP A SYNCHRONOUS MACHINE

[75] Inventors: Pierre Couture, Boucherville; Bruno Francoeur; Ghislain Lambert, both of Beloeil, all of Canada

[73] Assignee: Hydro-Quebec, Montreal, Canada

[21] Appl. No.: 365,459

[22] Filed: Dec. 28, 1994

[51] Int. Cl.$^6$ .................................................. H02P 1/46
[52] U.S. Cl. ........................ 318/720; 318/722; 318/430; 318/254
[58] Field of Search .................................. 318/700, 720, 318/721, 722, 430, 431, 254, 138, 139

[56] References Cited

U.S. PATENT DOCUMENTS

| | | | |
|---|---|---|---|
| 4,368,411 | 1/1983 | Kidd | 318/254 |
| 4,409,530 | 10/1983 | Neeper et al. | 318/685 |
| 4,429,262 | 1/1984 | Utenick | 318/254 |
| 4,546,293 | 10/1985 | Peterson et al. | 318/254 |
| 4,629,961 | 12/1986 | Blaschke | 318/803 |
| 4,636,702 | 1/1987 | Hedges | 318/729 |
| 4,712,050 | 12/1987 | Nagasawa et al. | 318/254 |
| 4,748,387 | 5/1988 | Tanuma et al. | 318/254 |
| 4,814,677 | 3/1989 | Plunkett | 318/254 |
| 5,162,709 | 11/1992 | Ohi | 318/254 |
| 5,194,794 | 3/1993 | Shamoto | 318/603 |
| 5,204,604 | 4/1993 | Radun | 318/701 |
| 5,221,880 | 6/1993 | Bartholow et al. | 318/139 |
| 5,221,881 | 6/1993 | Cameron | 318/254 |
| 5,327,034 | 7/1994 | Couture et al. | 310/67 R |

*Primary Examiner*—Bentsu Ro
*Attorney, Agent, or Firm*—Foley & Lardner

[57] ABSTRACT

The method and the apparatus are for starting up a synchronous machine having a rotor and a stator provided with a winding. The rotor has an initial position with respect to the stator. The method comprises the steps of (a) initializing a starting phase of a first vectorial sum of successive vectorial sums of currents to be applied to the winding; (b) applying successive vectorial sums of currents to the winding; (c) detecting, for each of the vectorial sums of currents applied in step (b), a movement of the rotor and a direction thereof; (d) compensating, for each of the movement and direction detected in step (c), the phase of a subsequent vectorial sum of currents applied to the winding to bring back the rotor towards its initial position; (e) detecting whether the rotor has moved with respect to the stator after applying of the successive vectorial sums of currents and either increasing the starting phase by a value different from a multiple of 180 electrical degrees if the rotor has not moved and returning to step (b), or going to a step (f); and (f) after step (e), storing the phase value of the last of the successive vectorial sums applied to the winding, whereby said machine is now ready to operate from the phase value stored in step (f).

24 Claims, 12 Drawing Sheets